(12) United States Patent
Kobayashi et al.

(10) Patent No.: US 6,679,059 B2
(45) Date of Patent: Jan. 20, 2004

(54) GAS TURBINE PLANT

(75) Inventors: Tadashi Kobayashi, Chigasaki (JP);
Takanari Okamura, Yokohama (JP);
Shokou Ito, Sagamihara (JP); Takashi Sasaki, Yokohama (JP); Akinori Koga, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/286,790

(22) Filed: Nov. 4, 2002

(65) Prior Publication Data

US 2003/0056513 A1 Mar. 27, 2003

Related U.S. Application Data

(62) Division of application No. 10/092,433, filed on Mar. 8, 2002, now abandoned, which is a division of application No. 09/855,667, filed on May 16, 2001, now abandoned, which is a division of application No. 09/154,730, filed on Sep. 17, 1998, now Pat. No. 6,253,554.

(30) Foreign Application Priority Data

Sep. 18, 1997 (JP) .............................. 9/253801

(51) Int. Cl.[7] .............................. F02C 7/18; F02C 7/224
(52) U.S. Cl. ............................................. 60/736; 60/806
(58) Field of Search ............................... 60/39.83, 734, 60/736, 785, 806

(56) References Cited

U.S. PATENT DOCUMENTS

| | | | | | |
|---|---|---|---|---|---|
| 2,940,257 | A | * | 6/1960 | Eckert et al. | 60/806 |
| 5,317,877 | A | * | 6/1994 | Stuart | 60/736 |
| 5,782,076 | A | * | 7/1998 | Huber et al. | 60/736 |
| 6,065,282 | A | * | 5/2000 | Fukue et al. | 60/806 |

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A gas turbine plant comprises an air compressor, gas turbine turbine including at least one high temperature section, a driven equipment, which are operatively connected in series, a gas turbine combustor arranged between the air compressor and the gas turbine, a fuel system disposed for supplying a fuel to the gas turbine combustor, and a heat exchange section for heating the fuel from the fuel by means of a high pressure air as a heating medium fed from the air compressor.

2 Claims, 16 Drawing Sheets

GAS TURBINE PLANT

This application is a Division of application Ser. No. 10/092,433, filed on March 8, 2002 abandoned, which is a division of Ser. No. 09/855,667 filed on May 16, 2001 abandoned; which is a division of Ser. No. 09/154,730, filed on Sep. 17, 1998 U.S. Pat. No. 6,253,554.

BACKGROUND OF THE INVENTION

The present invention relates to a gas turbine plant, and in particular, to a gas turbine plant which previously heats a fuel supplied to a gas turbine combustor of the gas turbine plant and enhances a quantity of heat so as to improve a plant heat (thermal) efficiency.

In a gas turbine plant, it has been known that the plant heat efficiency is improves if an inlet combustion temperature of a gas turbine is made high. The plant heat efficiency is calculated from a ratio of a gas turbine power to a fuel supplied to a gas turbine combustor.

Therefore, how to reduce a fuel to be supplied to the gas turbine combustor, or how to enhance an output of the gas turbine is an important matter in order to improve the plant heat efficiency.

In view of the gas turbine output power in the light of the improvement of the plant heat efficiency, there is a problem of an increase in a power per unit combustion gas flow (specific power). However, an improvement of flow characteristic of a gas turbine blade and a reduction in other mechanical loss have already reached the limit, and it is difficult to greatly improve the flow characteristic and reduce the mechanical loss.

On the other hand, in order to reduce fuel consumption so as to improve the plant heat efficiency, it is important to improve a quantity of heat of fuel itself.

Recently, there has been disclosed Japanese Patent No. 2540646 as means for improving the quantity of heat of fuel itself. As shown in FIG. 29, the Japanese Patent No. 2540646 relates to a so-called multi-shaft type combined cycle power generation plant which is constructed in such a manner that a shaft of a gas turbine plant 2 connected to an exhaust heat recovery boiler 1 is separated, and a steam turbine plant 3 is independently provided. A gas turbine combustor 4 is provided with a heat exchanger 5, and a heated water generated from an economizer 6 of the exhaust heat recovery boiler 1 is used as a heating source to be supplied to the heat exchanger 5, and thus, a heat exchange of a fuel F supplied to the gas turbine combustor 4 is made to increase a quantity of heat.

As described above, in the Japanese Patent No. 2540646, efforts have been made to reduce fuel consumption and to improve a plant heat efficiency because there is an anxiety that fossil fuel resources are exhausted in near future.

In the prior art shown in FIG. 29, a heated water on an outlet side of the economizer 6 having a relatively small influence on load fluctuation is used as a heating source of the heat exchanger 5 so as to heat the fuel F, and then, a gas turbine driving gas (main flow gas) having the same temperature is generated by a fuel flow rate relatively smaller that that of the conventional case, and thus, a plant heat efficiency is improved. However, the heated water on the outlet side of the economizer 6 has been used as a heating source of the fuel F, and for this reason, there have arisen several problems.

Primarily, the temperature of heated water generated from the economizer 6 is set on the basis of heat balance of the whole plant regardless of heating the fuel F. For this reason, the temperature of the heated water becomes high by heating the fuel, and then, a saturation pressure based on the high temperature of heated water excessively becomes high. Thus, a feed water pump 6a requires a high pressure rising force, and thus, this is a factor of increasing the cost.

During partial load operation, when a flow rate of the heat water supplied to the heat exchanger 5 becomes low, a quantity of feed water from the feed water pump 6a passing through the economizer 6 becomes low. In this case, however, an internal pressure of the feed water pump rises, and for this reason, the heat water discharged from the economizer 6 exceeds a saturation temperature. As a result, there is the possibility that steaming is generated.

Further, the heated water of the economizer 6 is used as a heating source of the fuel F. In this case, however, the aforesaid construction is applied to only the combined cycle power generation plant. For example, in the case of a simple cycle gas turbine, it is difficult to secure a heating source, and for this reason, there has been required a gas turbine plant which can readily secure the heating source.

As described above, the prior art shown in FIG. 29 can improve the plant heat efficiency, but provides the aforesaid several problems.

SUMMARY OF THE INVENTION

A primary object of the present invention is to substantially eliminate defects or drawbacks encountered in the prior art described above and to provide a gas turbine plant capable of relatively reducing a flow rate of fuel so as to improve a plant heat efficiency without giving any influence to other constituent equipments when using the gas turbine plant itself as a heating source for heating a fuel.

This and other objects can be achieved according to the present invention by providing, in one aspect, a gas turbine plant comprising:

an air compressor;

a gas turbine;

a driven equipment, the air compressor, the gas turbine and the driven equipment being operatively connected in series;

a gas turbine combustor arranged between the air compressor and the gas turbine;

a fuel system for supplying a fuel to the gas turbine combustor; and a heat exchange section for heating the fuel from the fuel system by means of a high pressure air as a heating source from the air compressor.

In a preferred embodiment, the heat exchange section is housed in the air compressor or mounted to a casing of the air compressor, and in the case of mounting to the casing, a fuel passage is formed by an outer cover covering an outer periphery of the casing, one side of the fuel passage being provided with a fuel inlet and a fuel outlet and another side of the fuel passage is provided with a connecting pipe.

In another aspect, there is provided a gas turbine plant comprising:

an air compressor;

a gas turbine;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

an extraction closed circuit system provided for the air compressor; and a heat exchange section provided for the extraction closed circuit system for heating the fuel supplied to the gas turbine combustor from the fuel system.

In a further aspect, there is provided a gas turbine plant comprising:

an air compressor;

a gas turbine including an exhaust gas system;

a driven equipment, the air compressor, the gas turbine and the driven equipment being operatively connected in series;

a gas turbine combustor arranged between the air compressor and the gas turbine;

a fuel system for supplying a fuel to the gas turbine combustor; and a heat exchange section provided for the exhaust gas system of the gas turbine for heating the fuel supplied to the gas turbine combustor from the fuel system.

In a still further aspect, there is provided a gas turbine plant comprising:

an air compressor;

a gas turbine including a high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system, the high pressure air after the heating being supplied to the high temperature section of the gas turbine as a cooling medium; and a high pressure air recovery system for recovering the an overall quantity or part of the high pressure air to the air compressor after cooling the high temperature section of the gas turbine.

In this aspect, the high pressure air supply system is divided into a plurality of high pressure air supply sections in accordance with a magnitude of pressure loss of the high pressure air passing through the high temperature section of the gas turbine, the plurality of high pressure air supply sections each being provided with a flow distributing device. The flow distributing device is either one of a flow control valve and an orifice. The high pressure air recovery system is divided into a plurality of high pressure air recovery sections so as to correspond to the divided plurality of high pressure air supply sections.

In a still further aspect, there is provided a gas turbine plant comprising:

an air compressor;

a gas turbine including a high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature section of the gas turbine for supplying a high pressure air from the air compressor thereto; and a heat exchange section provided for the high pressure air supply system for heating the fuel supplied to the gas turbine combustor from the fuel system, the high pressure air after the heating being supplied to the high temperature section of the gas turbine as a cooling medium and the high pressure air after cooling the high temperature section being joined with a gas turbine driving gas.

In a still further aspect, there is provided a gas turbine plant comprising:

an air compressor;

a gas turbine including at least one high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to at least one of the high temperature sections of the gas turbine as a cooling medium; and at least one high pressure air recovery system for recovering an overall quantity or part of the high pressure air after cooling the at least one of the high temperature sections of the gas turbine to the air compressor.

In a still further aspect, there is provided a gas turbine plant comprising:

an air compressor;

a gas turbine including at least one high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system;

a first pressure rising compressor for rising a pressure of the high pressure air after heating the fuel and for supplying the high pressure air to at least one of the high temperature sections of the gas turbine as a cooling medium;

a second pressure rising compressor which is bypassed from an outlet side of the first pressure rising compressor and rising a pressure of the high pressure air after heating the fuel and for supplying the high pressure air to at least one of other high temperature sections of the gas turbine as a cooling medium; and a high pressure air recovery system for recovering an overall quantity or part of the high pressure air after cooling the high temperature sections of the gas turbine to the air compressor.

In a still further aspect, there is provided a gas turbine plant comprising:

an air compressor;

a gas turbine including a plurality of high temperature sections;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature sections of the gas turbine for supplying a high pressure air from the air compressor thereto;

a heat exchange section provided for the high pressure air supply system for heating the fuel supplied to the gas turbine combustor from the fuel system;

a plurality of pressure rising compressors for rising a pressure of the high pressure air after heating the fuel and for supplying the high pressure air to the high temperature sections, respectively, as a cooling medium; and a high pressure air recovery system for recovering an overall quantity or part of the high pressure air after cooling the the high temperature sections of the gas turbine to the air compressor.

In a still further aspect, there is provided a gas turbine plant comprising:

an air compressor;

a gas turbine including a plurality of high temperature sections;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature sections of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to the at least one high temperature section as a cooling medium, said high pressure air supply system being directly connected to at least one of other high temperature sections so as to supply the high pressure air after heating the fuel as a cooling medium; and a plurality of high pressure air recovery systems for recovering an overall quantity or part of the high pressure air after cooling the high temperature sections of the gas turbine to the air compressor in accordance with the plurality of high temperature sections, respectively.

In a still further aspect, there is provided a gas turbine plant comprising:

an air compressor;

a gas turbine including a plurality of high temperature sections;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature sections of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to the high temperature sections of the gas turbine as a cooling medium;

a high pressure air recovery system for recovering an overall quantity or part of the high pressure air after cooling at least one of said high temperature sections of the gas turbine to the air compressor; and a cooling recovery system for recovering the overall quantity or part of the high pressure air after cooling at least one of other high temperature sections of the gas turbine to an inlet side of the heat exchange section.

In a still further aspect, there is provided a gas turbine plant comprising:

an air compressor;

a gas turbine including a high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor; and a high pressure air supply system operatively connected to the high temperature section of the gas turbine for supplying the high pressure air from the air compressor, the high pressure air supply system being provided with a heat exchange section for heating the fuel from the fuel system and another heat exchange section for heating a heat utilizing device for heating a medium to be heated of the heat utilizing device.

In a still further aspect, there is provided a gas turbine plant comprising:

an air compressor;

a gas turbine including a high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor; and an air extraction closed circuit system provided for the air compressor, the air extraction closed circuit system being provided with a heat exchange section for heating the fuel from said fuel system and another heat exchange section for heating a heat utilizing device for heating a medium to be heated of the heat utilizing device.

In a still further aspect, there is provided a gas turbine plant comprising:

an air compressor;

a gas turbine including an exhaust gas system and being combined with a steam turbine;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a heat exchange section provided for the exhaust gas system of the gas turbine for heating a fuel supplied from the fuel system to the gas turbine combustor; and a plurality of exhaust heat recovery heat exchange section provided for the exhaust gas system of the gas turbine for heating a feed water of the steam turbine plant so as to generate a steam.

In a still further aspect, there is provided a gas turbine plant comprising:

an air compressor;

a gas turbine including a high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor; and an air extraction closed circuit system provided for the air compressor, the air extraction closed circuit system being provided with a heat exchange section for heating the fuel from the fuel system to the gas turbine combustor, a valve opening control unit for detecting a fuel leak into the high pressure air by a fuel leak detector provided for the heat exchange section and for closing a fuel valve of the fuel system when a detection signal exceeds a predetermined value, and an alarm device for giving an alarm when the detection signal exceeds the predetermined value.

In a still further aspect, there is provided a gas turbine plant comprising:

an air compressor;

a gas turbine;

a driven equipment, the air compressor, the gas turbine and the driven equipment being operatively connected in series;

a gas turbine combustor arranged between the air compressor and the gas turbine;

a fuel system for supplying a fuel to the gas turbine combustor; and a heat exchange section for heating the fuel from the fuel system by means of a high pressure air as a heating source from the air compressor, the heat exchange section being divided into a first heat exchange unit for heating an intermediate heating medium by a high temperature heating medium and a second heat exchange unit for heating the fuel by the thus heated intermediate heating medium.

In a still further aspect, there is provided a gas turbine plant comprising:

an air compressor;

a gas turbine;

a driven equipment, the air compressor, the gas turbine and the driven equipment being operatively connected in series;

a gas turbine combustor arranged between the air compressor and the gas turbine;

a fuel system for supplying a fuel to the gas turbine combustor; and a heat exchange section for heating the fuel from the fuel system by means of a high pressure air as a heating source from the air compressor, the heat exchange section being divided into a high temperature chamber and a low temperature chamber and being provided with a heating pipe crossing the high temperature chamber and the low temperature chamber so that the heating pipe is heated by a high temperature heating medium in the high temperature chamber and the fuel is heated in the low temperature chamber.

In a still further aspect, there is provided a gas turbine plant comprising:

an air compressor including an air discharging unit;

a gas turbine;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a discharge air recovery system provided so as to bypass the air discharging system of the air compressor, the air discharging unit being provided with an air discharge valve to which is disposed a valve opening control unit which opens and closes the air discharge valve in response to at least one signal of a rotational speed signal of a gas turbine shaft and a power signal of the driven equipment; and a heat exchange section provided for the discharge air recovery system for heating the fuel supplied from the fuel system to the gas turbine combustor.

In a still further aspect, there is provided a gas turbine plant comprising:

an air compressor;

a gas turbine including at least one high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to at least one of the high temperature sections of the gas turbine as a cooling medium, said pressure rising compressor being connected to a gas turbine shaft; and at least one high pressure air recovery system for recovering an overall quantity or part of the high pressure air after cooling the at least one of the high temperature sections of the gas turbine to the air compressor.

In this aspect, the pressure rising compressor is directly connected to the gas turbine shaft or connected through a power transmission mechanism, which may be composed of either one of a gear mechanism and a torque converter mechanism.

In a still further aspect, there is provided a gas turbine plant comprising:

an air compressor;

a gas turbine including at least one high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to at least one of the high temperature sections of the gas turbine as a cooling medium;

a re-circulation system bypassing from an intermediate portion between an outlet side of the pressure rising compressor and a check valve disposed to an inlet side of the high temperature section of the gas turbine, the re-circulation system being provided with a re-circulation valve and being connected to an inlet side of the heat exchange section; and at least one high pressure air recovery system for recovering an overall quantity or part of the high pressure air after cooling the at least one of the high temperature sections of the gas turbine to the air compressor.

In this aspect, the re-circulation system includes a valve opening control unit which calculates a pressure ratio of the pressure rising compressor in response to a pressure signal from each of an inlet side and an outlet side of the pressure rising compressor, a rotational speed signal of a gas turbine shaft, a power signal of the driven equipment, a temperature signal of the high pressure air recovered to the air compressor, then computes the valve opening signal so that the pressure ratio becomes a specified value determined by at least one of the rotational speed signal of the gas turbine shaft, the power signal of the driven equipment, the temperature signal of the high pressure air recovered to the air compressor, and supplies the operational signal to the re-circulation valve.

In a still further aspect, there is provided a gas turbine plant comprising:

an air compressor;

a gas turbine including at least one high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor, the fuel system being provided with a fuel valve;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to at least one of the high temperature sections of the gas turbine as a cooling medium; and at least one high pressure air recovery system provided with a high pressure air recovery check valve for recovering an overall quantity or part of the high pressure air after cooling the at least one of the high temperature sections of the gas turbine to the air compressor, the pressure rising compressor being provided with a bypass system including a check valve and a valve opening control unit which closes the fuel valve of the fuel system when an accident happens in the pressure rising compressor while opening a discharge valve provided on an inlet side of the high pressure air recovery check valve of the high pressure air recovery system.

In this aspect, the valve opening control unit serves to close the fuel valve of the fuel system in response to the pressure signal from each of an inlet side and an outlet side of the pressure rising compressor and a rotational speed signal of a pressure rising compressor driving equipment while opening a discharge valve provided on the inlet side of the high pressure air recovery check valve of the high pressure air recovery system.

In a still further aspect, there is provided a gas turbine plant comprising:

an air compressor;

a gas turbine including at least one high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor, the fuel system being provided with a fuel valve;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to at least one of the high temperature sections of the gas turbine as a cooling medium;

at least one high pressure air recovery system provided with a high pressure air recovery check valve for recovering an overall quantity or part of the high pressure air after cooling the at least one of the high temperature sections of the gas turbine to the air compressor;

an accumulator which has a flow control valve on an outlet side of the check valve on the outlet side of the pressure rising compressor; and a valve opening control unit adapted to close the fuel valve of the fuel system when an accident happens in the pressure rising compressor while opening a discharge valve provided on an inlet side of the high pressure air recovery check valve of the high pressure air recovery system and adapted to open the flow control valve so that an accumulated air from the accumulator is supplied to the at least one of the high temperature sections of the gas turbine.

In a still further aspect, there is provided a gas turbine plant comprising:

an air compressor;

a gas turbine including at least one high temperature section;

a driven equipment, the air compressor, the gas turbine and the driven equipment being operatively connected in series;

a gas turbine combustor arranged between the air compressor and the gas turbine;

a fuel system for supplying a fuel to the gas turbine combustor;

a high pressure air supply system operatively connected to the high temperature section of the gas turbine for supplying a high pressure air from the air compressor thereto;

a heat exchange section provided for the high pressure air supply system for heating the fuel supplied to the gas turbine combustor from the fuel system;

a pressure rising compressor for rising a pressure of the high pressure air after heating the fuel and for supplying the high pressure air to at least one of the high temperature sections of the gas turbine as a cooling medium;

at least one high pressure air recovery system provided with a high pressure air recovery check valve for recovering an overall quantity or part of the high pressure air after cooling the at least one of the high temperature sections of the gas turbine to the air compressor; and a valve opening control unit adapted to open a discharge valve provided on an outlet side of the pressure rising compressor when an accident happens in the pressure rising compressor so that a residual high pressure air of the air compressor conversely flows into the at least one of the high temperature sections of the gas turbine and adapted to open the discharge valve provided on an inlet side of the heat exchange section.

According to the present invention of the various aspects mentioned above, in the gas turbine plant according to the present invention, the high pressure air of the air compressor is used as a heating source for heating a fuel supplied from the fuel section to the gas turbine combustor. Further, the gas turbine plant is provided with means for cooling the high temperature sections of the gas turbine by reusing the high pressure air which has been used for heating the fuel. Therefore, the quantity of heat (energy) of fuel increases while the plant heat efficiency being improved, and it is possible to sufficiently deal with the high output accompanying with the high temperature gas turbine drive gas supplied to the gas turbine.

Further, in the gas turbine plant according to the present invention, in the case where the high pressure air from the air compressor is used as a heating source so as to heat the fuel, there is provided a heat exchange section, and the heat exchange section is provided with safety means. Therefore, the gas turbine plant can be safely operated without giving any hindrance to other components.

Further, in the gas turbine plant according to the present invention, in the case where the high pressure air which has been used for heating the fuel is reused as a cooling medium for cooling the gas turbine high temperature section, there is provided a pressure rising compressor, and the pressure rising compressor includes means capable of taking sufficient measures if an accident happens in the pressure rising compressor. Therefore, it is possible to securely cool the high temperature section of the gas turbine, and to keep the material strength of the high temperature section at a preferable state.

It is to be noted that the nature and further characteristic features of the present invention will be made more clear from the following descriptions made with reference to the accompanying drawings.

DESCRIPTION OF THE PREFERRED EMBODIMENTS

Figure 1:
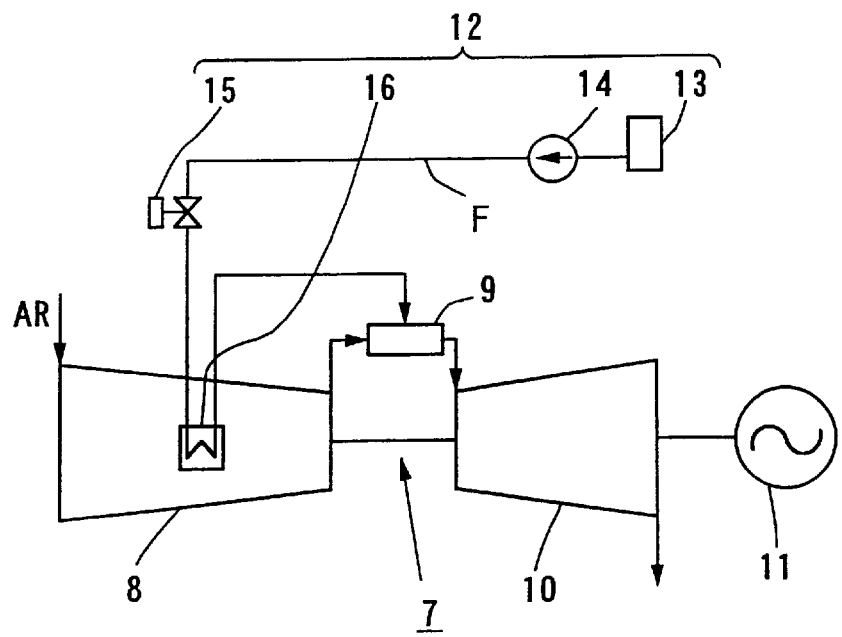
FIG. 1 is a system diagram schematically showing a gas turbine plant according to a first embodiment of the present invention.

Embodiments of a gas turbine plant according to the present invention will be described hereunder with reference to the accompanying drawings and reference numerals shown in these drawings.

FIG. 1 is a system diagram schematically showing a gas turbine plant according to a first embodiment of the present invention.

A gas turbine plant 7 includes an air compressor 8, a gas turbine combustor 9, a gas turbine 10, a driven equipment 11 such as a generator, and a fuel section 12.

In the gas turbine plant 7, an air AR sucked in the air compressor 8 is made high in pressure, and the high pressure air (highly pressurized air) is supplied to the gas turbine combustor 9 together with a fuel F from the fuel section 12. A gas turbine driving combustion gas (main flow gas) generated by the gas turbine combustor 9 is supplied to the gas turbine 10, and then, the gas turbine combustion gas is expanded so as to rotate and drive the driven equipment 11 with a rotating torque generated in the expanding process.

On the other hand, the fuel section 12 includes a fuel tank 13, a fuel pump 14, and a fuel valve 15, and in this structure, the fuel section 12 may be called a fuel supply section or system. A heat exchange section (heat exchanger or heat exchanging unit) 16 is provided for the air compressor 8. The fuel F from the fuel tank 13 is pressurized by the fuel pump 14, and then, a flow rate of the fuel F is controlled by the fuel valve 15. Thereafter, a high pressure air (highly pressurized air) of the air compressor 8 makes heat exchange in the heat exchange section 16 so as to be used as a heating source, and at this time, the fuel F is increased in its quantity of heat (energy) and is supplied to the gas turbine combustor 9. Incidentally, a recent air compressor has a pressure ratio of 15 or more, and a high pressure air temperature of 400° C. or more corresponding to the pressure ratio. Therefore, the air compressor can be sufficiently used as a heating source with respect to a temperature for heating fuel, that is, about 350° C.

As described above, in this first embodiment, when heating the fuel F, the high pressure air of the air compressor 8 is used as a heating source. Thus, the heating source can be readily obtained, and a flow rate of fuel can be relatively reduced without giving any influence to other constituent equipments as compared with the conventional case, and therefore, a plant heat efficiency can be improved.

Figure 2:
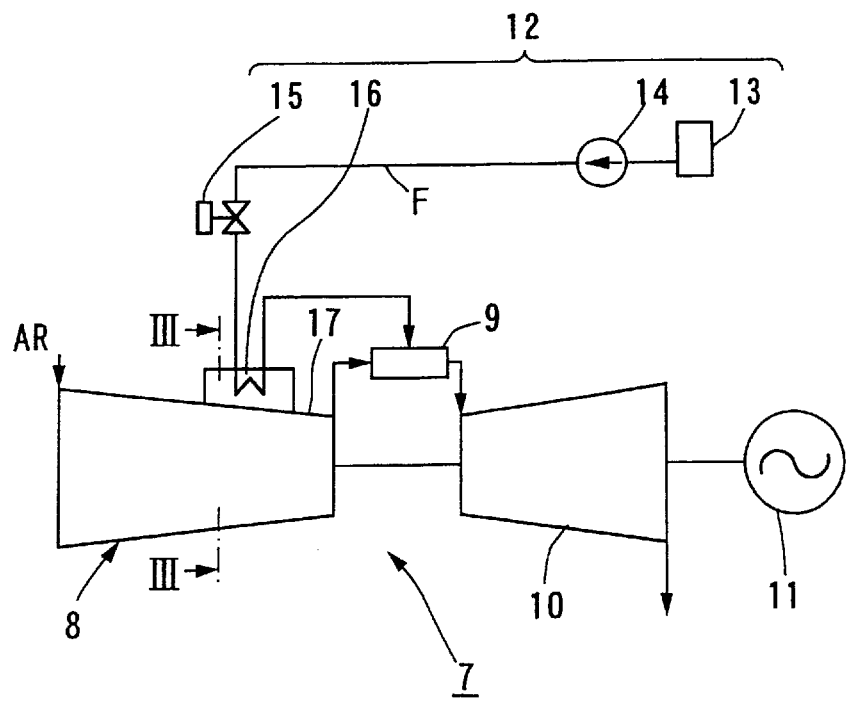
FIG. 2 is a system diagram schematically showing a modified embodiment of the gas turbine plant according to a first embodiment of the present invention.

FIG. 2 is a diagram schematically showing a modified embodiment of the heat exchange section 16 according to the present invention. In this case, like reference numerals are used to designate the same components as the first embodiment or the corresponding part, and the overlapping explanation is omitted.

Figure 3:
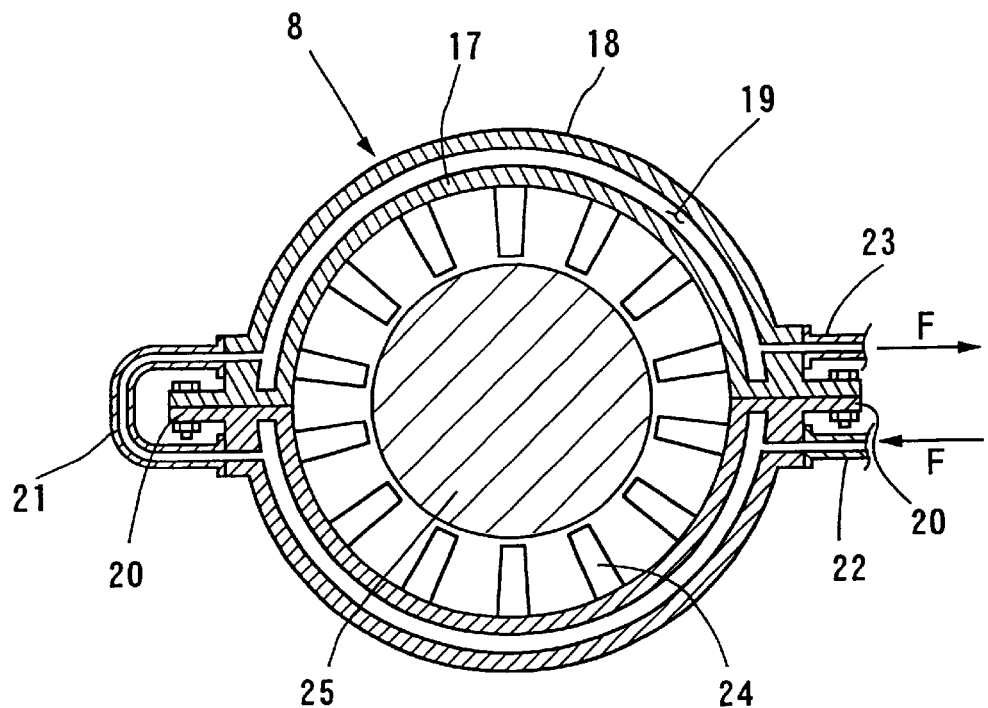
FIG. 3 is a schematically cross sectional view of a heat exchange section cut along an arrow III—III in FIG. 2.

The heat exchange section 16 of this embodiment is provided at a casing 17 of the air compressor 8. The heat exchange section 16 is constructed in the following manner. More specifically, as shown in FIG. 3, an outer cover 18 is formed concentrically with the casing 17 of the air compressor 8 so as to form a fuel passage 19, and one side of the fuel passage 19 is provided with a fuel inlet 22 and a fuel outlet 23. Further, the other side of the fuel passage 19 is provided with a connecting pipe 21, and a high pressure air passing through air compressor stationary blades 24 is used as a heating source so as to heat the fuel F passing through the fuel passage 19. Incidentally, a reference numeral 20 denotes a flange, and a reference numeral 25 denotes a rotary shaft (rotor).

In this embodiment, even though the heat exchange section 16 is provided on the casing 17 of the air compressor 8, the temperature of high pressure air is high as described above, so that the fuel F can be sufficiently and preferably heated.

Figure 4:
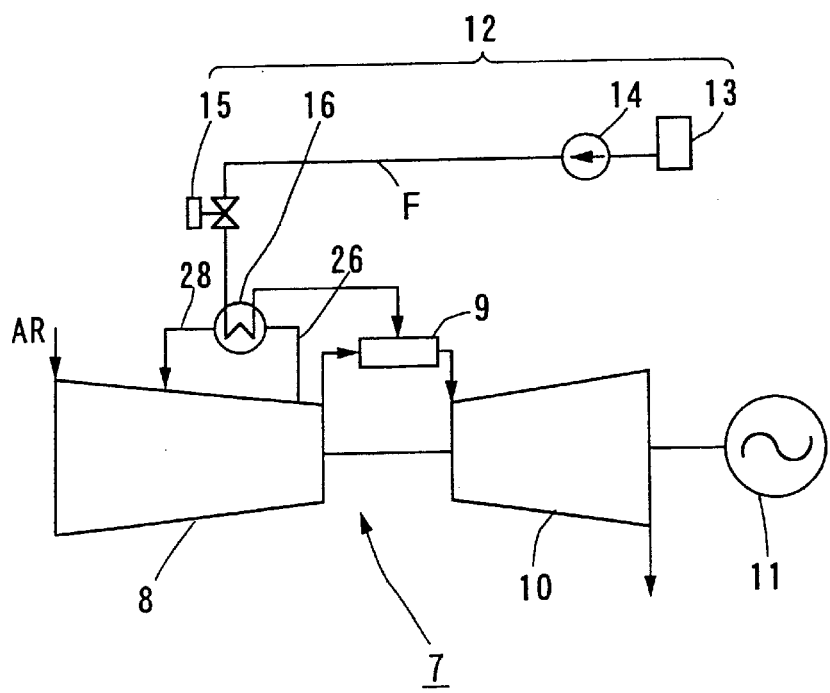
FIG. 4 is a system diagram schematically showing a gas turbine plant according to a second embodiment of the present invention.

FIG. 4 is a system diagram schematically showing a gas turbine plant according to a second embodiment of the present invention. Incidentally, like reference numerals are used to designate the same components as the first embodiment or the corresponding parts.

In this embodiment, an air extraction closed (circuit) system 26 is provided at an outlet or a high pressure stage of the air compressor. The air extraction closed system 26 includes the heat exchanger section 16 and a high pressure air which has been used for heating the fuel F is recovered to an inlet or a low pressure stage of the air compressor 8.

As described above, in this embodiment, the fuel F is heated with the utilization of the air extraction of the air compressor 8, and the extracted air is recovered to the air compressor 8. Therefore, a heating source is effectively used, so that a plant heat (thermal) efficiency can be improved.

Figure 5:
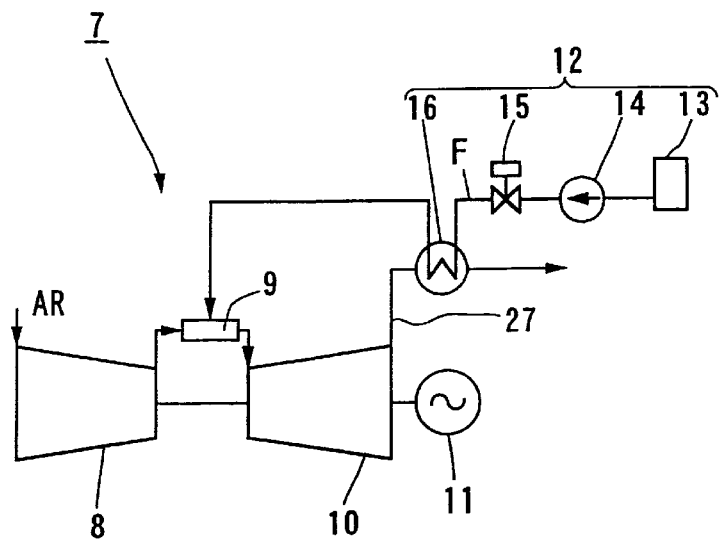
FIG. 5 is a system diagram schematically showing a gas turbine plant according to a third embodiment of the present invention.

FIG. 5 is a diagram schematically showing a gas turbine plant according to a third embodiment of the present invention. Incidentally, like reference numerals are used to designate the same components as the first embodiment or the corresponding parts.

In this embodiment, the heat exchange section 16 is provided at an exhaust gas system 27 on an outlet side of the gas turbine 10.

In general, in an open cycle gas turbine, a gas turbine driving gas (main flow gas) expanded in the gas turbine 10 is discharged into atmosphere. The temperature of the exhaust gas (exhaust heat) is about 600° C. and is extremely high.

In this embodiment, the high temperature exhaust gas has been taken into consideration. The exhaust gas from the gas turbine 10 is used as a heating source, and then, the fuel F from the fuel section 12 is heated in the heat exchange section 16.

As described above, in this embodiment, a heat of the exhaust gas from the gas turbine 10 is effectively used, and a quantity of heat of the fuel F is made high, and thus, the fuel flow rate is relatively reduced as compared with the conventional case. Therefore, a plant heat efficiency can be greatly improved as compared with the conventional case.

Figure 6:
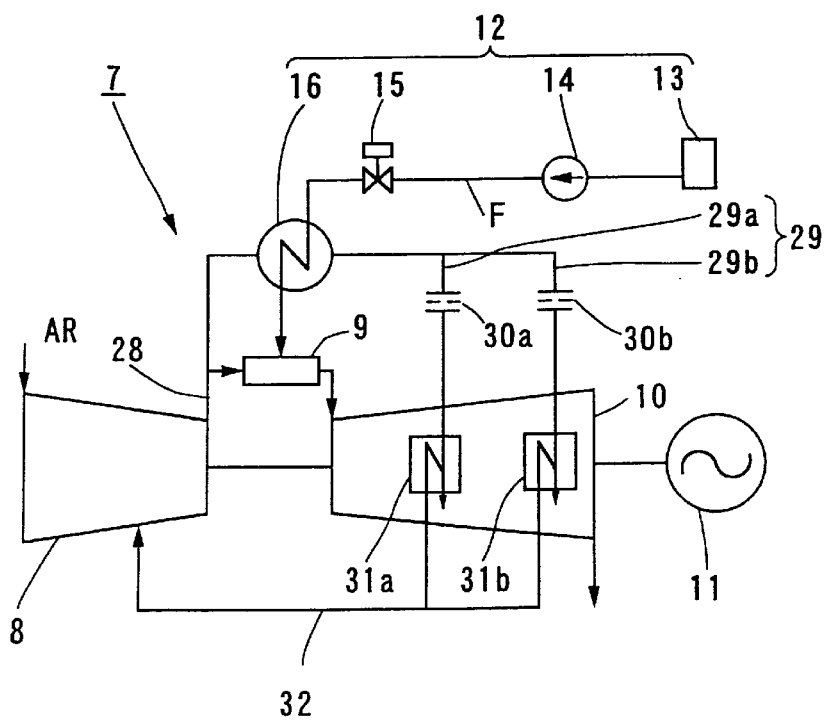
FIG. 6 is a system diagram schematically showing a gas turbine plant according to a fourth embodiment of the present invention.

FIG. 6 is a system diagram schematically showing a gas turbine plant according to a fourth embodiment of the present invention. Incidentally, like reference numerals are used to designate the same components as the first embodiment or the corresponding parts.

In this embodiment, the following matter has been taken into consideration. More specifically, when reusing a high pressure air which has been used for heating the fuel F for cooling high temperature sections 31*a* and 31*b* of the gas turbine 10, the high pressure air preferably flows depending upon magnitudes of presser losses in these high temperature sections 31*a* and 31*b*. There is provided a high pressure air supply system 29 which is bypassed to a air feed system 28 for supplying a high pressure air from the outlet side of the air compressor 8 to the gas turbine combustor 9. The high pressure air supply system 29 is provided at its intermediate portions with the heat exchange section 16 of the fuel section 12 and flow distributing devices 30*a* and 30*b*, and the high pressure air supply system 29 is divided into a first high pressure air supply system 29*a* and a second high pressure air supply system 29*b*. Each of the first and second supply systems 29*a* and 29*b* are connected to the high temperature sections 31*a* and 31*b* of the gas turbine 10, for example, to gas turbine stationary blades and gas turbine rotating blades, etc. Further, there is provided a high pressure air recovery system 32 which recovers the overall quantity or a part of the high pressure air which has been used for cooling the high temperature sections 31*a* and 31*b* of the gas turbine to the air compressor 8. In this case, although the high pressure air supply system 29 is bypassed from the air feed system 26, it may be provided at an intermediate stage of the air compressor 8. Moreover, two high temperature section 31*a* and 31*b* of the gas turbine 10 are shown as an example. Two or more high temperature sections may be provided. The flow distributing devices 30*a* and 30*b* are constituted specifically as flow control valves or orifices. In the case of using the orifices, a hole diameters of the orifices are set so as to meet with flow rates required for the high temperature sections 31*a* and 31*b*.

In this embodiment, the fuel F from the fuel section 12 is heated by the high pressure air from the air compressor 8, and after the fuel F is heated, the high temperature sections 31*a* and 31*b* of the gas turbine 10 are cooled by the high pressure air whose temperature becomes low. Further, the overall quantity or part of the high pressure air which has been used for cooling is recovered to the air compressor 8, so that heat can be effectively used. Therefore, a plant heat efficiency is improved, and it is possible to maintain a material strength of the high temperature sections 31*a* and 31*b* of the gas turbine 10 while the gas turbine plant 7 being made high temperature.

Figure 7:
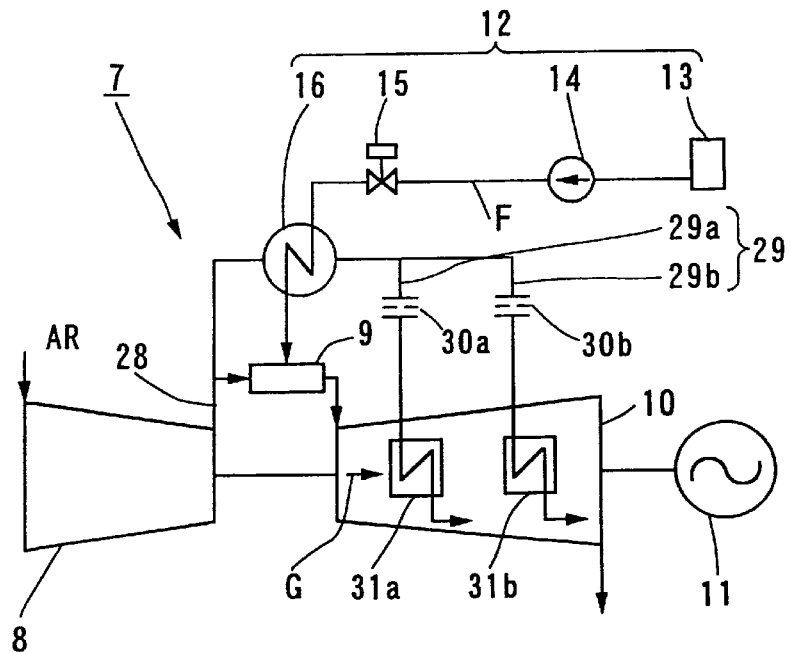
FIG. 7 is a system diagram schematically showing a first modified embodiment of the gas turbine plant according to the fourth embodiment of the present invention.

FIG. 7 is a system diagram schematically showing a first modified embodiment of the gas turbine plant according to the fourth embodiment of the present invention. In this case, like reference numerals are used to designate the same components as the fourth embodiment or the corresponding part.

In this embodiment, the high pressure air which has been used for cooling the high temperature sections 31*a* and 31*b* of the gas turbine 10 is joined together with a gas turbine driving gas G (main flow gas).

In this embodiment, the high pressure air which has been used for cooling the high temperature sections 31*a* and 31*b* of the gas turbine 10 is joined together with a gas turbine driving gas G so as to increase the driving gas G. Thus, there is an expansion work of the gas turbine 10 is increased, being advantageous.

Figure 8:
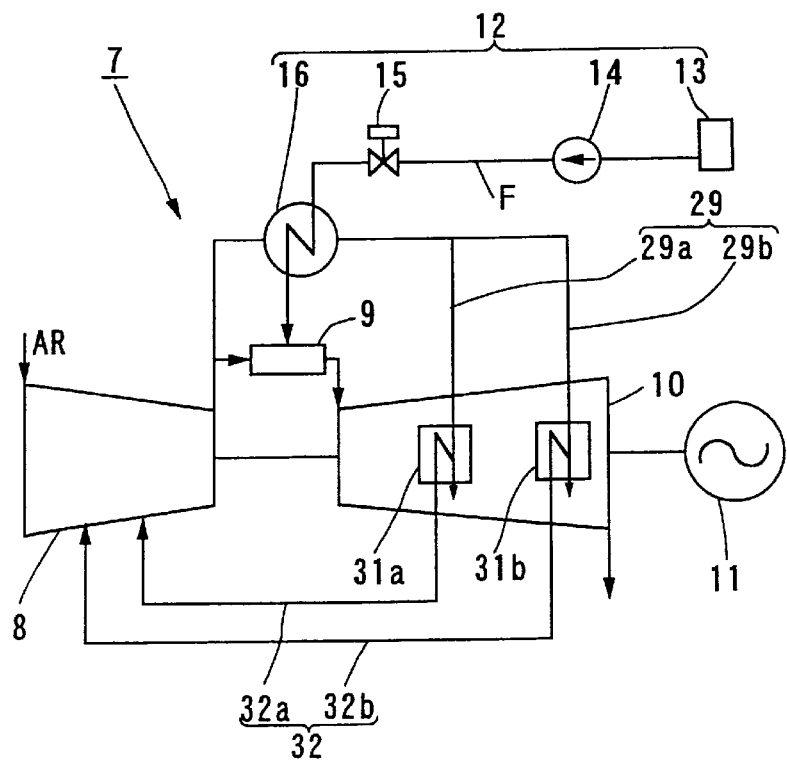
FIG. 8 is a system diagram schematically showing a second modified embodiment of the gas turbine plant according to the fourth embodiment of the present invention.

FIG. 8 is a system diagram schematically showing a second modified embodiment of the gas turbine plant according to the fourth embodiment of the present invention. In this case, like reference numerals are used to designate the same components as the fourth embodiment or the corresponding part.

In this embodiment, there is provided the high pressure air recovery system 32 for recovering the high pressure air which has been used for cooling the high temperature sections 31*a* and 31*b* of the gas turbine 10 from the first high pressure air supply system 29*a* and the second high pressure air supply system 29*b* to the air compressor 8. The high pressure air recovery system 32 is divided into a first high pressure air recovery system 32*a* and a second high pressure air recovery system 32*b*. The first high pressure air recovery system 32*a* and the second high pressure air recovery system 32*b* are connected to a relatively high pressure stage of the air compressor 8 and to a relatively low pressure stage of the air compressor 8, respectively.

As described above, in this embodiment, when recovering the overall quantity or part of the high pressure air which has been used for cooling the high temperature sections 31a and 31b of the gas turbine 10 to the air compressor 8 via each of the recovery systems 32a and 32b, the high pressure air is recovered so as to meet with a pressure level of a driving air of the air compressor 8. Thus, even if a pressure difference differs between the high temperature sections 31a and 31b of the gas turbine 10, the high pressure air of a proper quantity can be allowed to flow.

Figure 9:
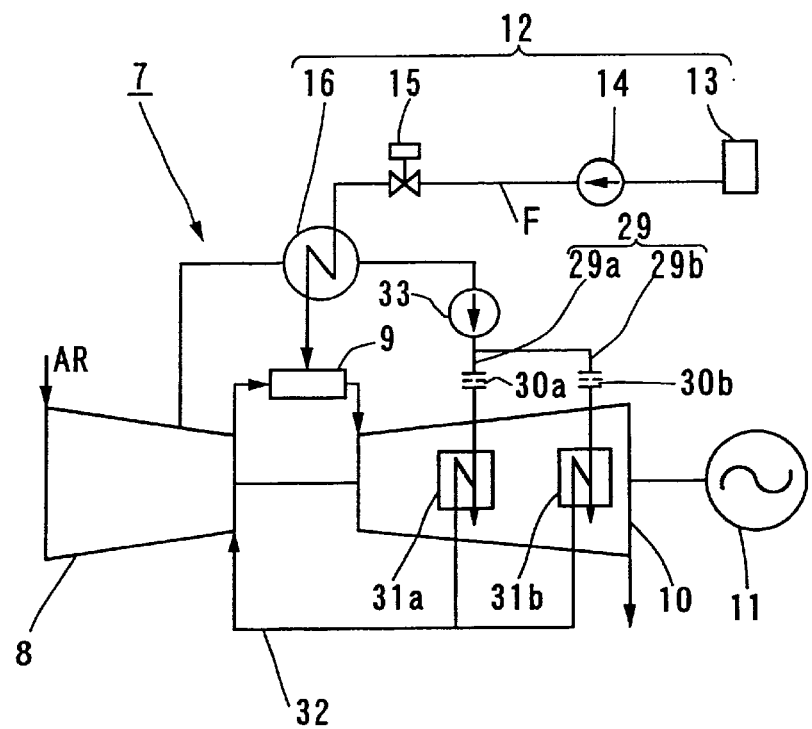
FIG. 9 is a system diagram schematically showing a third modified embodiment of the gas turbine plant according to the fourth embodiment of the present invention.

FIG. 9 is a system diagram schematically showing a third modified embodiment of the gas turbine plant according to the fourth embodiment of the present invention. In this case, like reference numerals are used to designate the same components as the fourth embodiment or the corresponding part.

In this embodiment, a pressure rising compressor 33 is provided in the high pressure air supply system 29 which is divided into the first high pressure air supply system 29a and the second high pressure air supply system 29b. In the heat exchange section 16 of the fuel section 12, the high pressure air from the air compressor 8 is used as a heating source to heat the fuel F, and then, the high pressure air whose temperature becomes low is made high in pressure and is supplied as a cooling medium for cooling the high temperature sections 31a and 31b of the gas turbine 10.

As described above, in this embodiment, the high pressure air whose temperature and pressure become low, which has been used for cooling the fuel F is elevated in its pressure by the pressure rising compressor 33, so that the high pressure air can be securely supplied to the high temperature sections 31a and 31b of the gas turbine 10. Therefore, the high temperature sections 31a and 31b of the gas turbine 10 can be securely cooled.

Figure 10:
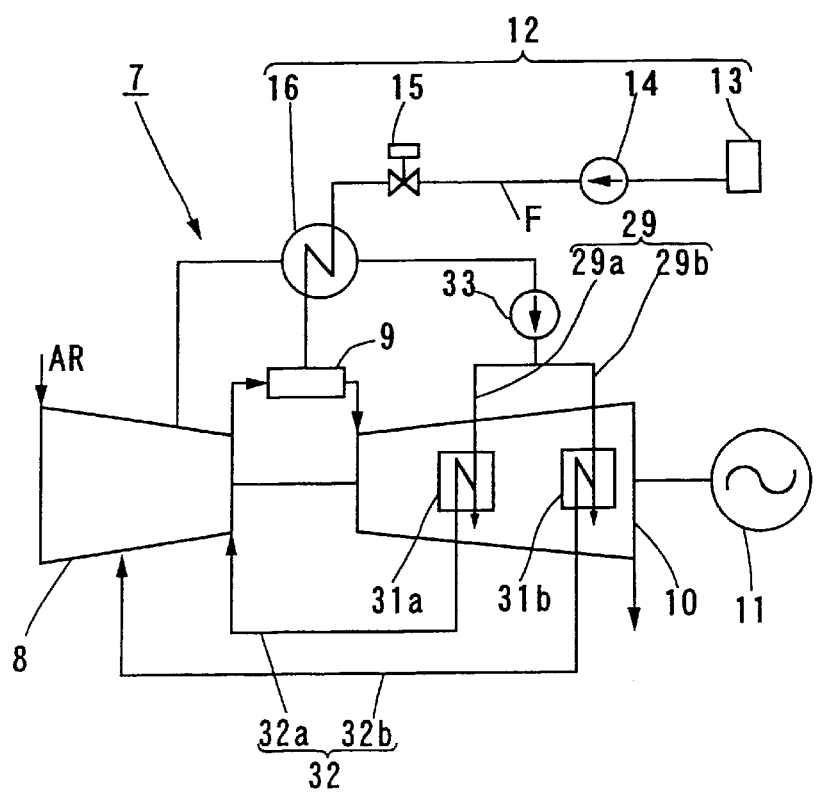
FIG. 10 is a system diagram schematically showing a fourth modified embodiment of the gas turbine plant according to the fourth embodiment of the present invention.

FIG. 10 is a system diagram schematically showing a fourth modified embodiment of the gas turbine plant according to the fourth embodiment of the present invention. In this case, like reference numerals are used to designate the same components as the fourth embodiment or the corresponding part.

In this embodiment, the pressure rising compressor 33 is provided in the high pressure air supply system 29 which is divided into the first high pressure air supply system 29a and the second high pressure air supply system 29b, and further, there is provided the high pressure air recovery system 32 for recovering the overall quantity or part of high pressure air which has been used for cooling the high temperature sections 31a and 31b of the gas turbine 10 to the air compressor 8. The high pressure air recovery system 32 is divided into a first high pressure air recovery system 32a and a second high pressure air recovery system 32b.

As described above, in this embodiment, the high pressure air supply system 29 is provided with the pressure rising compressor 33, and the fuel F is heated by the heat exchange section 16 of the fuel section 12, and further, the high pressure air whose temperature becomes low is heightened in its pressure, and thus, is supplied to the high temperature sections 31a and 31b of the gas turbine 10 as a cooling medium for cooling them. Then, the overall quantity or part of the high pressure air whose pressure becomes low which has been used for cooling the high temperature sections 31a and 31b of the gas turbine 10, is recovered to the air compressor 8 via the high pressure air recovery system 32 divided into the first high pressure air recovery system 32a and the second high pressure air recovery system 32b. Therefore, a heat of the high pressure air of the air compressor 8 is effectively used, so that a plant heat efficiency can be improved as compared with the conventional case.

Figure 11:
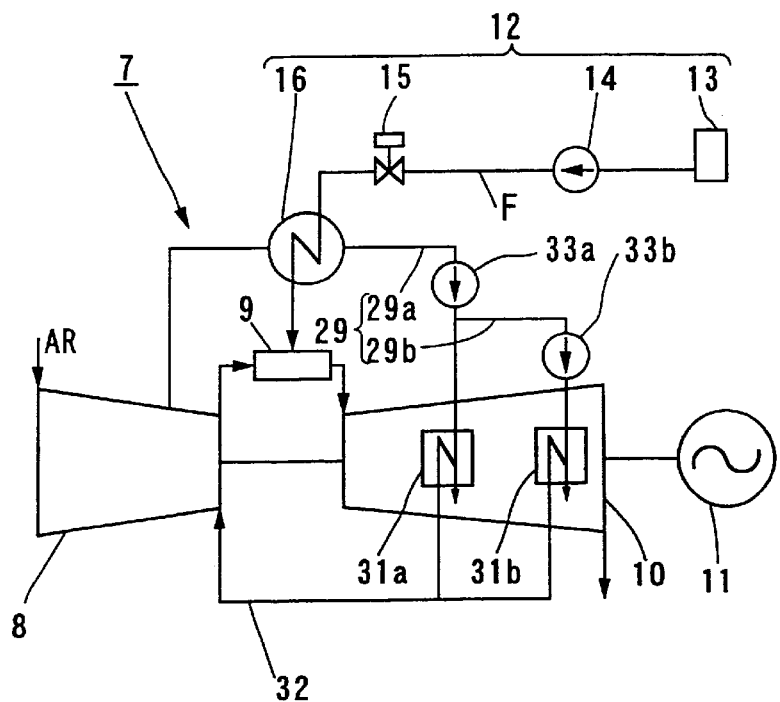
FIG. 11 is a system diagram schematically showing a fifth modified embodiment of the gas turbine plant according to the fourth embodiment of the present invention.

FIG. 11 is a system diagram schematically showing a fifth modified embodiment of the gas turbine plant according to the fourth embodiment of the present invention. In this case, like reference numerals are used to designate the same components as the fourth embodiment or the corresponding part.

In this embodiment, the high pressure air supply system 29 is divided into the first high pressure air supply system 29a and the second high pressure air supply system 29b, and these supply systems 29a and 29b are individually provided with a first pressure rising compressor 33a and a second pressure rising compressor 33b. Further, the second high pressure air supply system 29b is bypassed from an outlet side of the first pressure rising compressor 33a.

As described above, in this embodiment, these supply systems 29a and 29b are individually provided with the first pressure rising compressor 33a and the second pressure rising compressor 33b, and further, the second high pressure air supply system 29b is bypassed from the outlet side of the first pressure rising compressor 33a. Thus, the fuel F is heated by the heat exchange section 16 of the fuel section 12, and it is possible to securely supply the high pressure air whose temperature becomes low to the high temperature sections 31a and 31b. Therefore, each of the high temperature sections 31a and 31b can be securely cooled.

Figure 12:
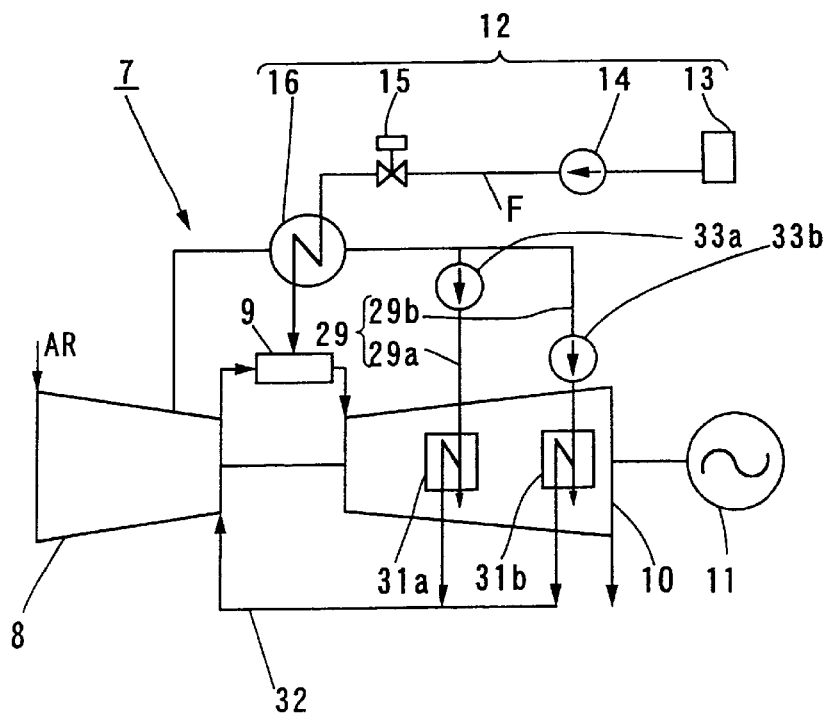
FIG. 12 is a system diagram schematically showing a sixth modified embodiment of the gas turbine plant according to the fourth embodiment of the present invention.

FIG. 12 is a system diagram schematically showing a sixth modified embodiment of the gas turbine plant according to the fourth embodiment of the present invention. In this case, like reference numerals are used to designate the same components as the fourth embodiment or the corresponding part.

In this embodiment, the high pressure air supply system 29 is divided into the first high pressure air supply system 29a and the second high pressure air supply system 29b which are arranged in parallel. In these supply systems 29a and 29b, the first high pressure air supply system 29a is provided with the first pressure rising compressor 33a, and the second high pressure air supply system 29b is provided with the second pressure rising compressor 33b.

In this embodiment, these supply systems 29a and 29b are provided with the pressure rising compressors 33a and 33b, respectively. Thus, like the fifth modified embodiment of the fourth embodiment, the fuel F is heated by the heat exchange section 16 of the fuel section 12, and it is possible to securely supply the high pressure air whose temperature becomes low to the high temperature sections 31a and 31b. Therefore, it is possible to sufficiently meet with the gas turbine 10 of the gas turbine plant 7 heated to a high temperature.

Figure 13:
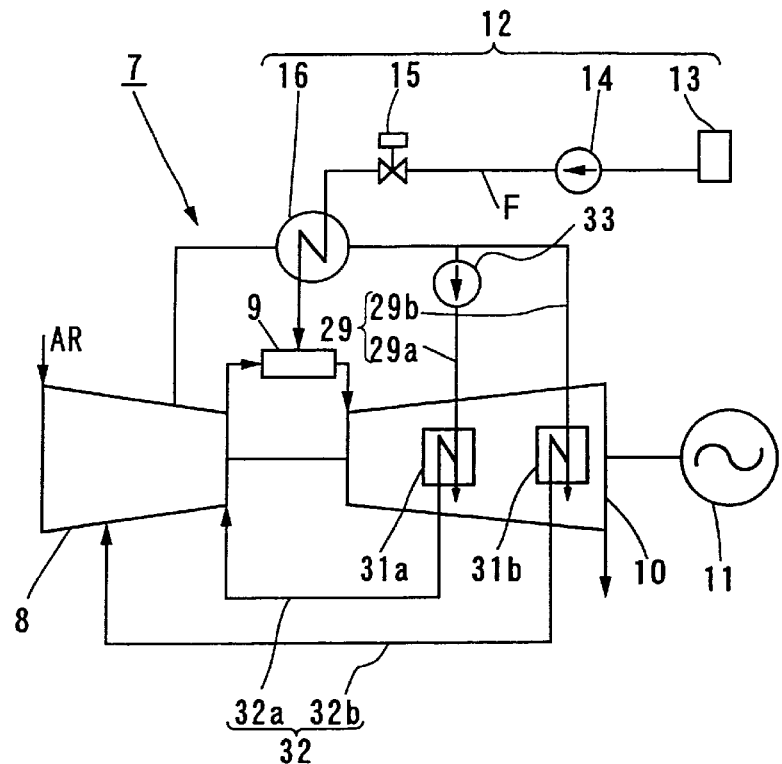
FIG. 13 is a system diagram schematically showing a seventh modified embodiment of the gas turbine plant according to the fourth embodiment of the present invention.

FIG. 13 is a system diagram schematically showing a seventh modified embodiment of the gas turbine plant according to the fourth embodiment of the present invention. In this case, like reference numerals are used to designate the same components as the fourth embodiment or the corresponding part.

In this embodiment, the following matter is taken into consideration. Specifically, a pressure loss in the high pressure air passing through the high temperature section 31b situated on a low pressure stage of the gas turbine 10, is relatively small. The high pressure air supply system 29 is divided into the first high pressure air supply system 29a and the second high pressure air supply system 29b which are arranged in parallel, and only the first high pressure air supply system 29a is provided with the pressure rising compressor 33. Further, there is provided the high pressure air recovery system 32 for recovering the overall quantity or part of the high pressure air which has been used for cooling the high temperature sections 31a and 31b of the gas turbine 10 to the air compressor 8. Then, the high pressure air recovery system 32 is divided into the first high pressure air recovery system 32a and the second high pressure air recovery system 32b. The first high pressure air recovery system 32a and the second high pressure air recovery system 32b are connected to a high pressure stage side of the air compressor 8 and to a low pressure stage side of the air compressor 8, respectively.

Therefore, in this embodiment, the fuel F is heated by the heat exchange section 16 of the fuel section, and the high pressure air whose temperature becomes low can be securely supplied to the high temperature sections 31a and 31b of the gas turbine 10. Further, when recovering the overall quantity or part of the high pressure air which has been used for cooling the high temperature sections 31a and 31b of the gas turbine 10, the high pressure air can be preferably recovered without giving a fluctuation to a driving air of the air compressor 8.

Figure 14:
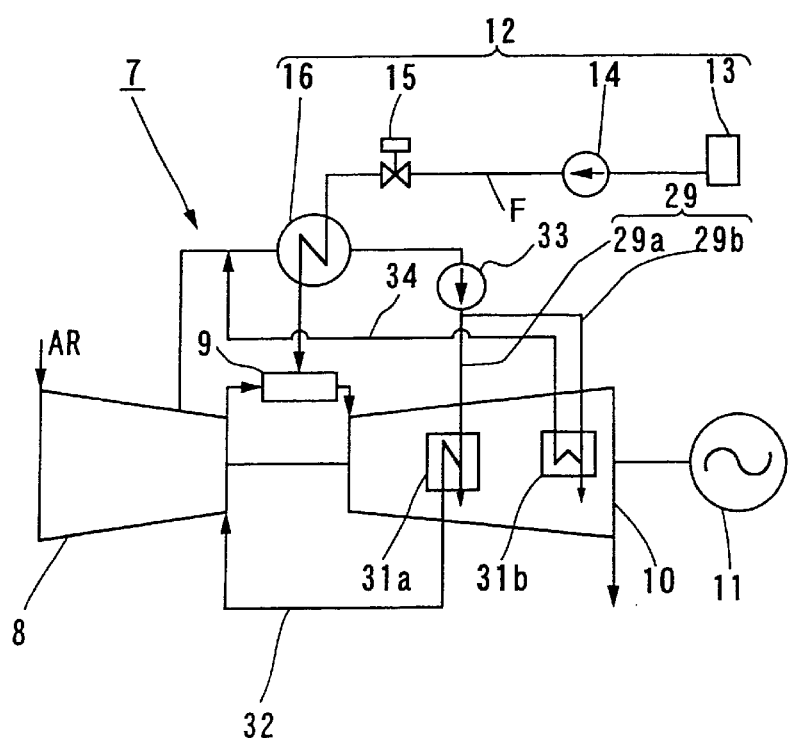
FIG. 14 is a system diagram schematically showing an eighth modified embodiment of the gas turbine plant according to the fourth embodiment of the present invention.

FIG. 14 is a system diagram schematically showing an eighth modified embodiment of the gas turbine plant according to the fourth embodiment of the present invention. In this case, like reference numerals are used to designate the same components as the fourth embodiment or the corresponding part.

In this embodiment, the high pressure air supply system 29 is divided into the first high pressure air supply system 29a and the second high pressure air supply system 29b, and the pressure rising compressor 33 is provided so as to correspond to the inlets of the divided first high pressure air supply system 29a and second high pressure air supply system 29b. There are further provided the high pressure air recovery system 32 for recovering the overall quantity or part of the high pressure air from the first high pressure air supply system 29a which has been used for cooling the high temperature section 31a on a relatively high pressure stage side of the gas turbine 10 to the outlet side of the air compressor 8, and a cooling recovery system 24 for recovering the overall quantity or part of the high pressure air from the second high pressure air supply system 29b which has been used for cooling the high temperature section 31b on a relatively low pressure stage side of the gas turbine 10, to the inlet side of the heat exchange section 16 of the fuel section 12.

As described above, in this embodiment, the high pressure air supply system 29 is provided with the pressure rising compressor 33, and the outlet side of the pressure rising compressor 33 is divided into the first high pressure air supply system 29a and the second high pressure air supply system 29b. Further, the fuel F is heated by the heat exchange section 16 of the fuel section 12, and then, the high pressure air whose temperature becomes low is elevated in its pressure by the pressure rising compressor 33, and thus, is supplied to the high temperature sections 31a and 31b of the gas turbine 10 via the respective high pressure air supply systems 29a and 29b. Furthermore, the overall quantity or part of the high pressure air which has been used for cooling the high temperature sections 31a and 31b of the gas turbine 10 is recovered to the air compressor 8 via the high pressure air recovery system 32, and then, the overall quantity or part of the high pressure air after cooling them is recovered to the inlet side of the heat exchange section 16 via the cooling recovery system 34. Therefore, a heat is effectively used, so that a plant heat efficiency can be greatly improved more than conventional case.

Figure 15:
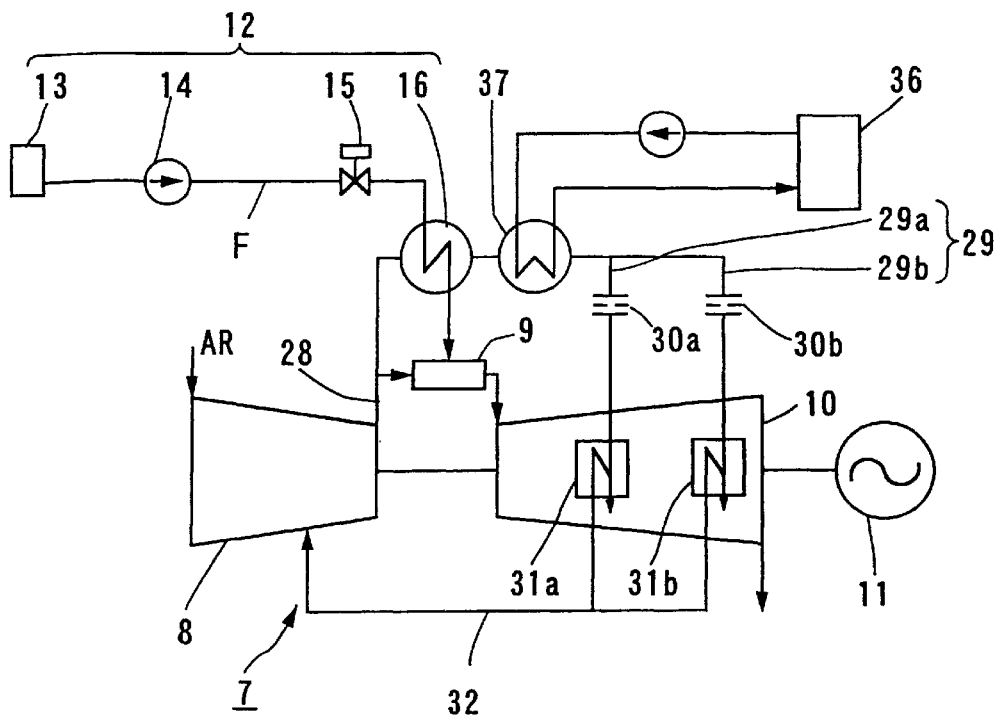
FIG. 15 is a system diagram schematically showing a gas turbine plant according to a fifth embodiment of the present invention.

FIG. 15 is a system diagram schematically showing a gas turbine plant according to a fifth embodiment of the present invention. In this case, like reference numerals are used to designate the same components as the first embodiment or the corresponding part.

In this embodiment, there is provided the high pressure air supply system 29 which is constructed in such a manner that an air supply system 28 for supplying the high pressure air from the air compressor 8 to the gas turbine combustor 9, is bypassed thereto. The high pressure air supply system 29 is provided with the heat exchange section 16 of the fuel section 12, and a heat utilizing device 36, for example, a heat exchange section 37 for co-generation heat recovery device. The high pressure air supply system 29 is further provided with flow distributing devices 30a and 30b so as to be divided into the first high pressure air supply system 29a and the second high pressure air supply system 29b. The divided first and second high pressure air supply systems 29a and 29b are connected to the high temperature sections 31a and 31b of the gas turbine 10, respectively.

According to the construction of this embodiment mentioned above, a part of the high pressure air supplied from the air supply system 28 of the air compressor 8 to the gas turbine combustor 9 is distributed to the high pressure air supply system 29, and then, the fuel F supplied from the fuel section 12 to the gas turbine combustor 9 is heated by the heat exchange section 16. Next, a medium to be heated from the heat utilizing device 36, for example, a cooling water, is heated by the heat exchange section 37 for heat utilizing device, and further, cools the high temperature sections 31a and 31b of the gas turbine 10 via the flow distributing devices 30a and 30b of the first and second high pressure air supply systems 29a and 29b, and thereafter, is recovered from the high temperature sections 31a and 31b to the air compressor 8 via the high pressure air recovery system 32.

As described above, in this embodiment, a part of the high pressure air supplied from the air supply system 28 of the air compressor 8 to the gas turbine combustor 9 is bypassed, and then, the bypassed high pressure air is used as a heating source so that the fuel F from the fuel section 12 is heated in the heat exchange section 16. Next, the medium to be heated from the heat utilizing device 36 is heated in the heat exchange section 37, and finally, the high pressure air whose temperature becomes low is used as a cooling source so that the high temperature sections 31a and 31b of the gas turbine 10 can be cooled. Therefore, the heat of the high pressure air can be effectively used for multi-purpose.

Figure 16:
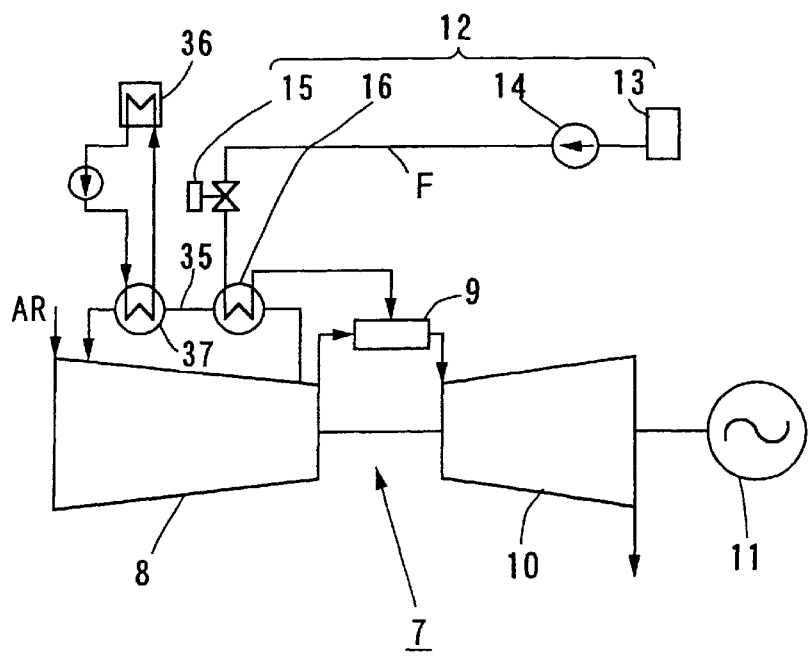
FIG. 16 is a system diagram schematically showing a gas turbine plant according to a sixth embodiment of the present invention.

FIG. 16 is a system diagram schematically showing a gas turbine plant according to a sixth embodiment of the present invention. In this case, like reference numerals are used to designate the same components as the first embodiment or the corresponding part.

In this embodiment, an air extraction closed system 35 is provided on a high pressure stage side of the air compressor 8. The air extraction closed system 35 is provided with the heat exchange section 16 of the fuel section 12, and the heat utilizing device 36, for example, the heat exchange section 37 for co-generation heat utilizing device. Then, the high pressure air from the air compressor 8 is used as a heating source so that the fuel F from the fuel section is heated in the heat exchange section 16. Further, a medium to be heated from the heat utilizing device 36, for example, a cooling water CW, is heated in the heat exchange section 37 for the heat utilizing device, and then, the high pressure air is recovered to the air compressor 8.

As described above, in this embodiment, the air compressor 8 is provided with the air extraction closed system 35, and the air extraction closed system 35 is provided with the heat exchange section 16 of the fuel section 12, the heat utilizing device 36 and the heat exchange section 37 for the heat utilizing device. Further, the high pressure air extracted from the air compressor 8 is used as a heating source so that the fuel F from the fuel section 12 is heated in the heat exchange section 16, and then, a medium to be heated from the heat utilizing device 36 is heated in the heat exchange section 37 for heat utilizing device. Therefore, the heat of high pressure air can be effectively used for multi-purpose.

Figure 17:
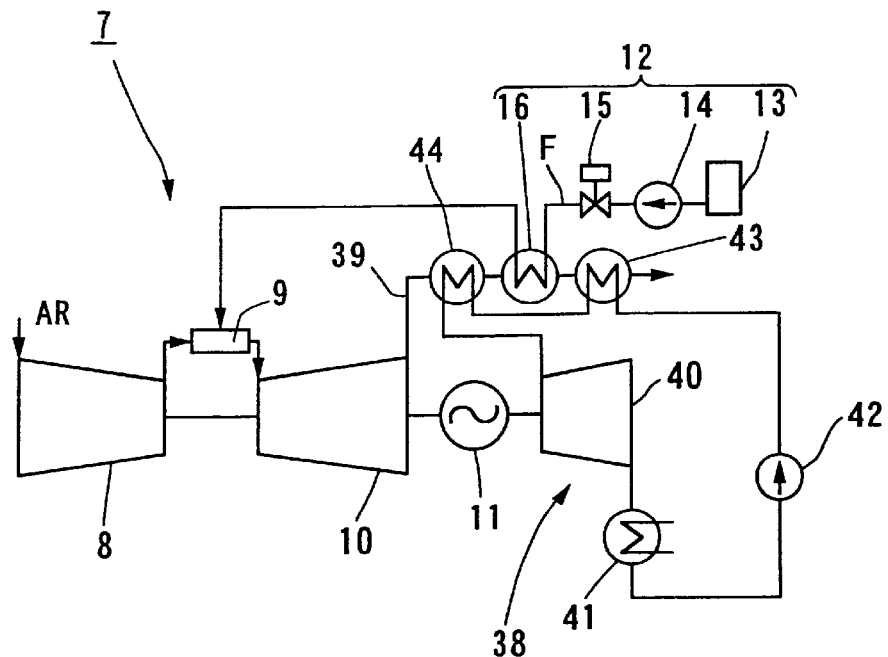
FIG. 17 is a system diagram schematically showing a gas turbine plant according to a seventh embodiment of the present invention.

FIG. 17 is a system diagram schematically showing a gas turbine plant according to a seventh embodiment of the present invention. In this case, like reference numerals are used to designate the same components as the first embodiment or the corresponding part.

In this embodiment, the gas turbine plant 7 is combined with a steam turbine plant 38, and an exhaust gas system 39 of the gas turbine 10 is provided with a first exhaust heat recovery heat exchanger 44 and a second exhaust heat recovery heat exchanger 43 of the steam turbine plant 38, and the heat exchange section 16 of the fuel section 12.

The steam turbine plant 38 is a so-called single-shaft type which is constructed in such a manner that the gas turbine 10 is connected in shaft directly to a steam turbine 40 via a driven equipment 11, for example, a generator. Further, the steam turbine plant 38 is formed as a closed circuit system including a condenser 41, a pump 42, the second exhaust heat recovery heat exchanger 43 and the first exhaust heat recovery heat exchanger 44. A feed water supplied from the pump 42 is heated (preheated) by the second exhaust heat recovery heat exchanger 43 with the use of an exhaust gas (exhaust heat) discharged from the exhaust gas system 39 of the gas turbine 10 to atmospheric air as a heating source. Further, the heated water is heated by the first exhaust heat recovery heat exchanger 44 using the exhaust gas of the heat exchanger 43 as a heating source, and thereby, the heated water is made into a steam, and the steam is supplied to the steam turbine 40, and thus, a power is generated. In this embodiment, the heat exchanger section 16 has been disposed between the first exhaust heat recovery heat exchanger 44 and the second exhaust heat recovery heat exchanger 43, as an example. The heat exchanger section 16 may be disposed on an upstream side of the first exhaust heat recovery heat exchanger 44 or may be disposed on a downstream side of the second exhaust heat recovery heat exchanger 43.

As described above, in this embodiment, the exhaust gas system 39 of the gas turbine 10 is provided with the first exhaust heat recovery heat exchanger 44 and the second exhaust heat recovery heat exchanger 43 of the steam turbine plant 38 and the heat exchange section 16 of the fuel section 12 so as to generate a steam and heat the fuel F, and the heat of exhaust gas is sufficiently used. Therefore, a plant heat efficiency can be greatly improved by a small quantity of fuel as compared with the conventional case.

Figure 18:
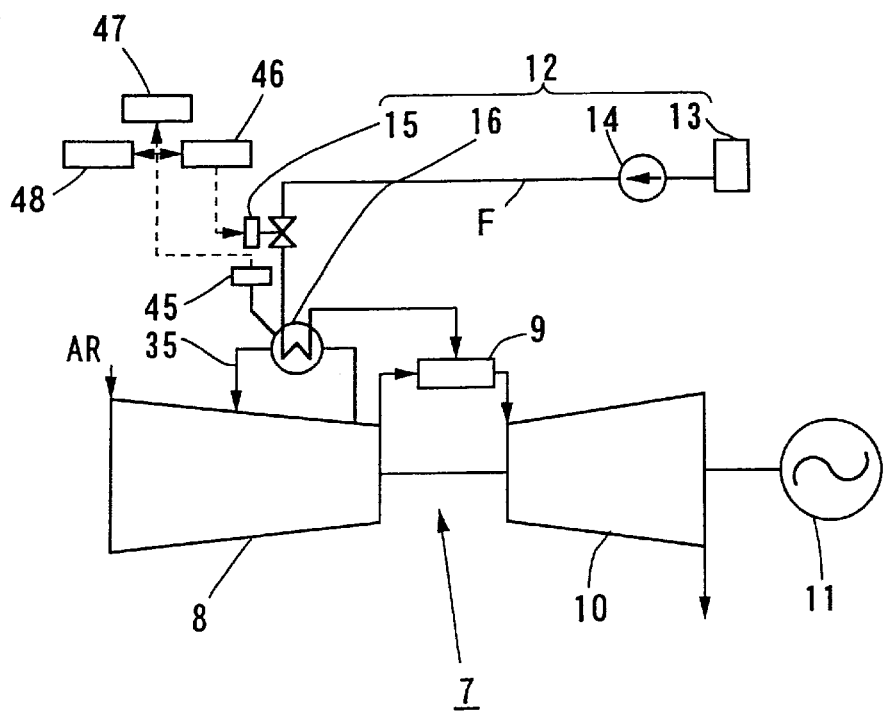
FIG. 18 is a system diagram schematically showing a gas turbine plant according to an eighth embodiment of the present invention.

FIG. 18 is a system diagram schematically showing a gas turbine plant according to an eighth embodiment of the present invention. In this case, like reference numerals are used to designate the same components as the first embodiment or the corresponding part.

In this eighth embodiment, the following matter is taken into consideration. More specifically, when the high pressure air extracted from the air compressor 8 is used as a heating source and the fuel F is heated in the heat exchange section 16 of the fuel section 12, in the case where the fuel F leaks into the high pressure air, this is a factor of causing an accident. For this reason, the heat exchange section 16 is provided with a fuel leak detector 45, a valve opening control section 46, an alarm device 47 and a fuel leak display device (indicator) 48.

The valve opening control section 46 is constructed so as to close a fuel valve 15 if a fuel leak signal detected by the fuel leak detector 45 exceeds a predetermined value. The alarm device 47 also gives the alarm if a fuel leak signal detected by the fuel leak detector 45 exceeds a predetermined value. The fuel leak display 48 displays a leaked fuel concentration detected by the fuel leak detector 45 so that a worker can visibly confirm the fuel leakage.

As described above, in this embodiment, if the leakage of fuel F exceeds a predetermined value, the alarm is given, and further, the fuel valve 15 is automatically closed. Therefore, the gas turbine combustor 9 can be safely operated without operating the gas turbine combustor 9 in a state that the fuel leaks.

Figure 19:
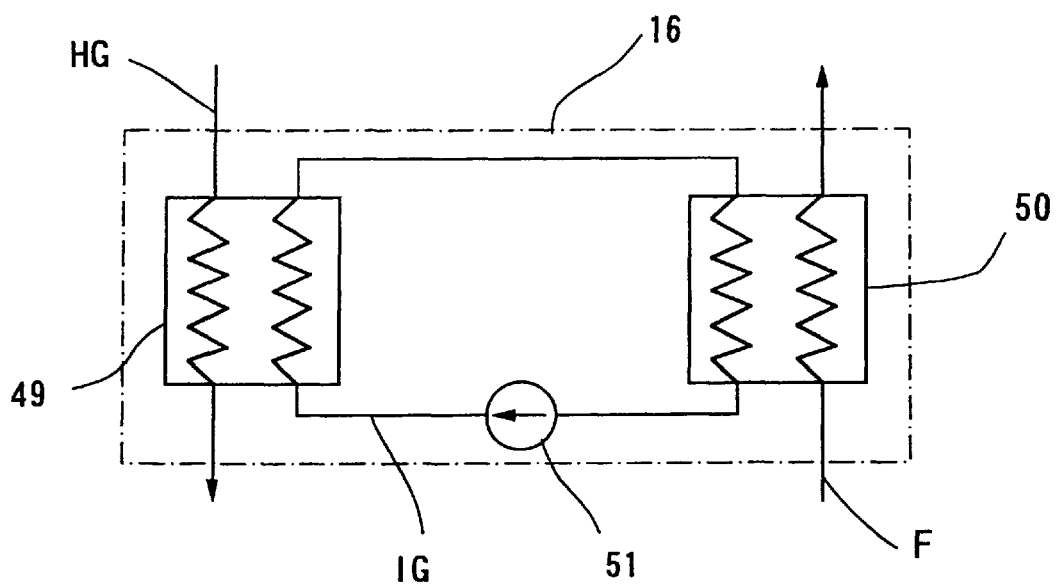
FIG. 19 is a system diagram schematically showing a first modified embodiment of the heat exchange section of the gas turbine plant according to the present invention.

FIG. 19 is a view schematically showing a first modified embodiment of the heat exchange section 16 in the gas turbine plant according to the present invention.

In general, in the heat exchange section 16, a fuel flows through a heat-transfer pipe, and a heating medium flows outside the heat-transfer pipe. In the heat exchange section 16 of this embodiment, a fuel leakage from the heat-transfer pipe is taken into consideration. More specifically, the heat exchange section 16 is divided into a first heat exchange section 49 and a second heat exchange section 50. Further, a high temperature heating medium HG flows through the first heat exchange section 49 while an intermediate heating medium IG, for example, an inert gas such as nitrogen gas or the like being supplied to the second heat exchange section 50 so that the fuel F is heated. Then, the intermediate heating medium IG heated the fuel F is circulated into the first heat exchange section 49 via a pump 51.

As described above, the heat exchange section 16 of this embodiment is divided into the first heat exchange section 49 and the second heat exchange section 50, and the fuel F is heated by the intermediate heating medium IG. Thus, even in the event that a fuel leakage occurs in the second heat exchange section 50, it is possible to prevent an accident such as explosion or the like, and there is no danger as compared with the conventional indirect heat exchanger, thus being advantageous.

Figure 20:
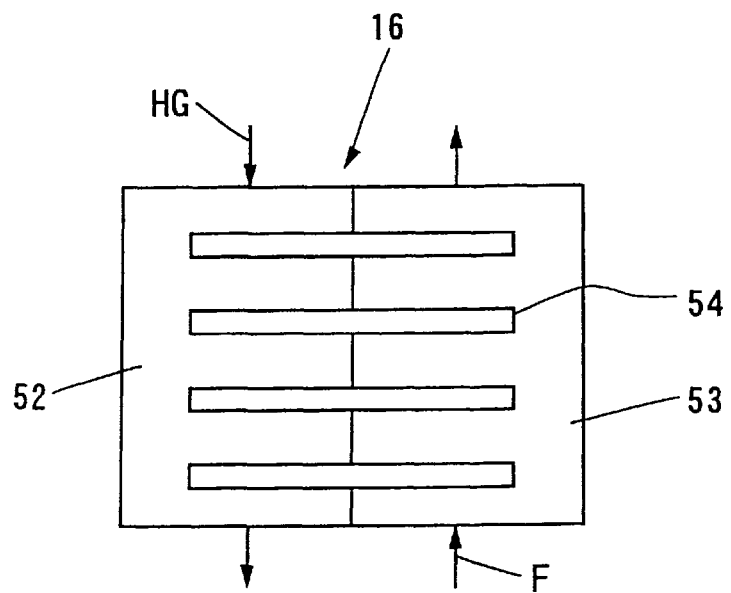
FIG. 20 is a system diagram schematically showing a second modified embodiment of the heat exchange section of the gas turbine plant according to the present invention.

FIG. 20 is a view schematically showing a second modified embodiment of the heat exchange section 16 in the gas turbine plant according to the present invention. The heat exchange section 16 of this embodiment is divided into a high temperature chamber 52 and a low temperature chamber 53 and is attached with a heat pipe 54 in a manner of crossing these chambers 52 and 53. The high temperature heating medium HG supplied to the high temperature chamber 52 heats the heat pipe 54, and then, the heat is transferred to the fuel F of the low temperature chamber 53 so as to heat the fuel F. Thus, even in the event that a fuel leakage occurs, there is no possibility of explosion, so that a safe operation of the heat exchange section 16 can be securely performed.

Figure 21:
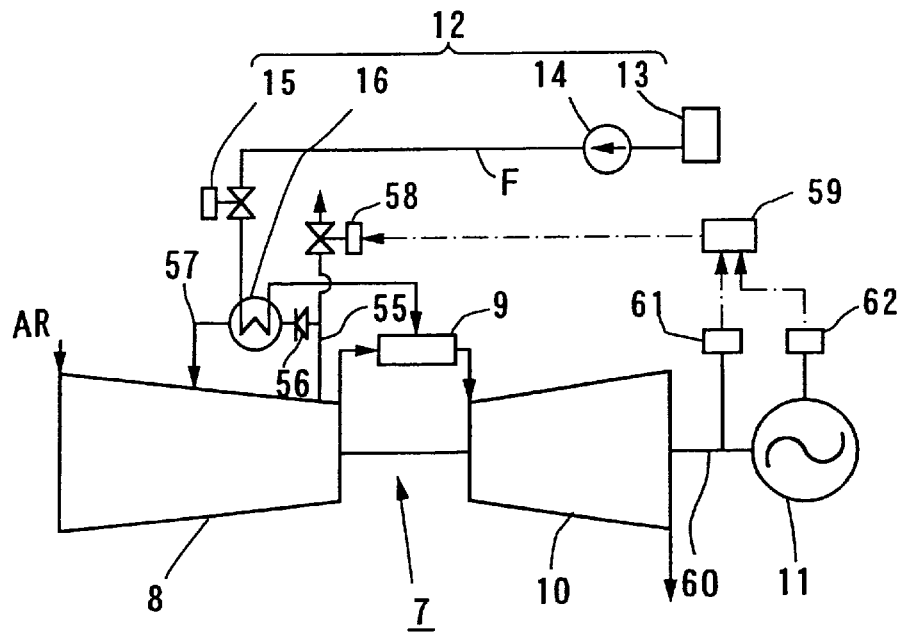
FIG. 21 is a system diagram schematically showing a gas turbine plant according to a ninth embodiment of the present invention.

FIG. 21 is a system diagram schematically showing a gas turbine plant according to a ninth embodiment of the present invention. In this case, like reference numerals are used to designate the same components as the first embodiment or the corresponding part.

In this ninth embodiment, the high pressure air discharged from the air compressor 8 via a discharged air system is used as a heating source for heating the fuel F of the fuel section 12. A check valve 56 and the heat exchange section 16 of the fuel section 12 are bypassed from the midway of the discharged air system 55, and thus, there is provided a discharged air recovery system 57 connected to a low pressure state of the air compressor 8 or to an outlet thereof.

The discharged air system 55 includes a discharged air valve 58. The discharged air valve 58 includes a valve opening control section 59. The valve opening is computed (operated) by the valve opening control section 59 on the basis of at least one or more signals of a rotational speed signal from a rotational speed detector 61 which detects a rotational speed of a gas turbine shaft 60 and an operating signal from a power detector 62 which detects a power of the driven equipment 11. In this manner, a control for opening and closing the valve is made on the basis of the operational signal.

As described above, in this embodiment, a flow rate of the high pressure air discharged from the air compressor 8 to the atmospheric air via the discharged air system 55 is controlled by the discharged air valve 58, and then, the high pressure air thus controlled in the flow rate is used as a heating source so that the fuel F of the fuel section 12 is heated in the heat exchange section 16 provided in the discharge air recovery system 57, and thus, is recovered to the air compressor 8. Therefore, the heat is effectively used, so that a plant heat efficiency can be improved as compared with the conventional case.

Figure 22:
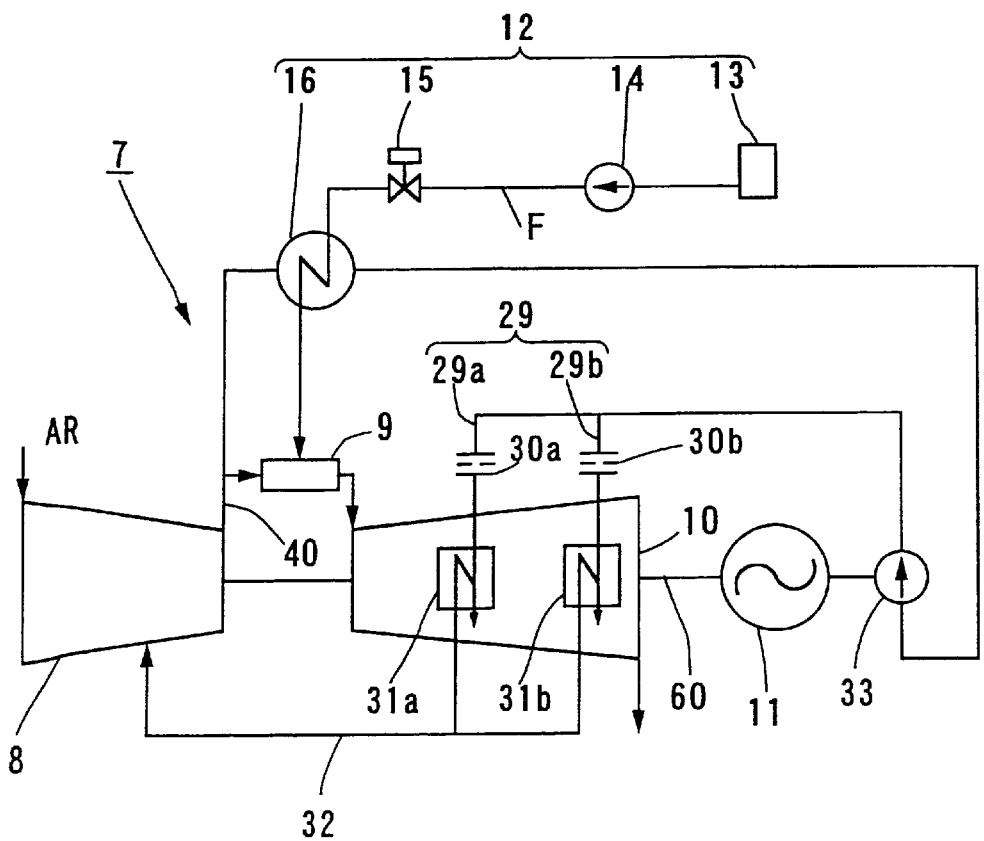
FIG. 22 is a system diagram schematically showing a gas turbine plant according to a tenth embodiment of the present invention.

FIG. 22 is a system diagram schematically showing a gas turbine plant according to a tenth embodiment of the present invention. In this case, like reference numerals are used to designate the same components as the first embodiment or the corresponding part.

In this tenth embodiment, the following matter is taken into consideration. More specifically, in the case where an accident happens in a driving source of the pressure rising compressor 33 provided in the high pressure air supply system 29 divided into the first high pressure air supply system 29a and the second high pressure air supply system 29b, and then, the pressure rising compressor 33 is not operated, the high pressure air from the air compressor 8 is not supplied to the high temperature sections 31a and 31b of the gas turbine 10 in order to cool these high temperature sections. Thus, the pressure rising compressor 33 is connected directly to the gas turbine shaft 60.

As described above, in this embodiment, the pressure rising compressor 33 is connected directly to the gas turbine shaft 60. Thus, the fuel F from the fuel section 12 is heated in the heat exchange section 16 using the high pressure air from the air compressor 8, and the high pressure air whose temperature becomes low is securely supplied to the high temperature sections 31a and 31b of the gas turbine 10 via the flow distributing devices 30a and 30b as a cooling medium for cooling these high temperature sections. Therefore, the gas turbine 10 can be safely operated.

Figure 23:
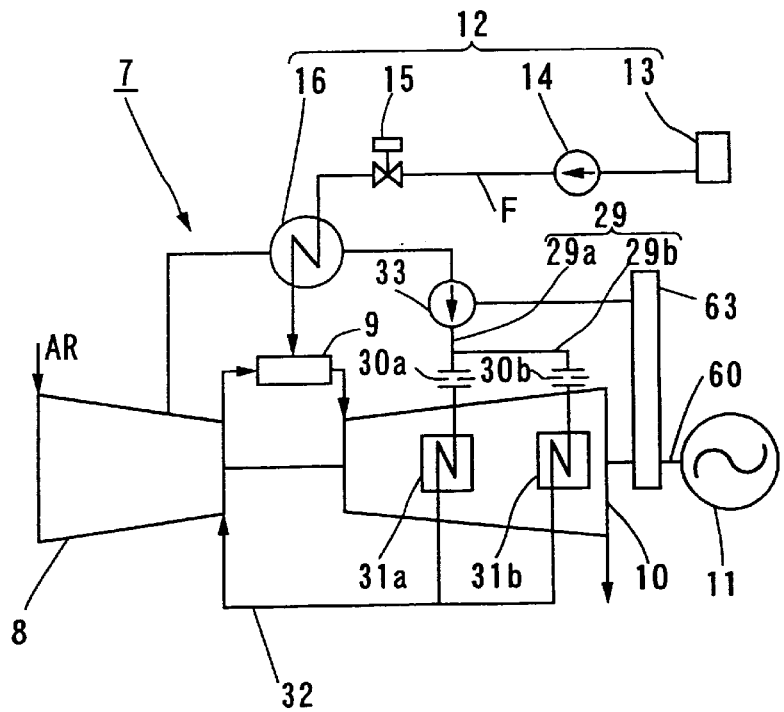
FIG. 23 is a system diagram schematically showing a modified embodiment of the gas turbine plant according to the tenth embodiment of the present invention.

FIG. 23 is a system diagram schematically showing a modified embodiment of the gas turbine plant according to the tenth embodiment of the present invention. In this case, like reference numerals are used to designate the same components as the tenth embodiment or the corresponding part.

In this embodiment, the pressure rising compressor 33 is provided in the high pressure air supply system 29 divided into the first high pressure air supply system 29a and the second high pressure air supply system 29b, and the pressure rising compressor 33 is connected to the gas turbine shaft 60 via a power transmission mechanism section 63. Either one of gear or torque converter is selected as the power transmission mechanism section 63.

In this embodiment, the pressure rising compressor 33 supplies the high temperature air from the air compressor 8 heating the fuel F in the heat exchange section 16 of the fuel section 12 to the high temperature sections 31a and 31b of the gas turbine as a cooling medium for cooling these high temperature sections. The pressure rising compressor 33 is connected to the gas turbine shaft 60 via the power transmission mechanism section 63 so as to be driven by a rotating torque of the gas turbine shaft 60. Therefore, the pressure rising compressor 33 can be securely driven.

Figure 24:
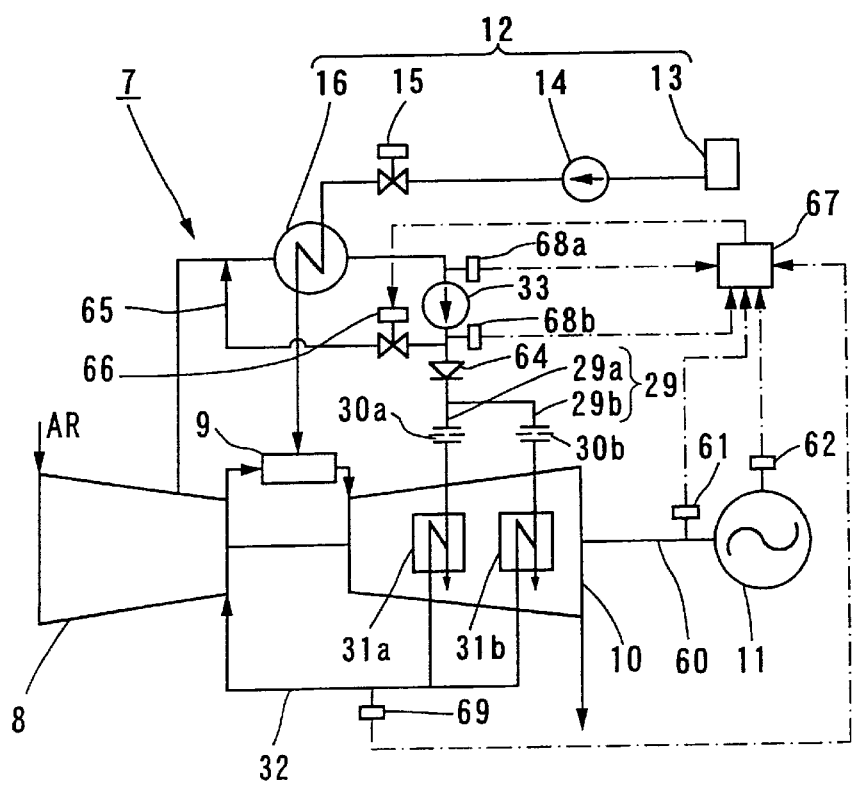
FIG. 24 is a system diagram schematically showing a gas turbine plant according to an eleventh embodiment of the present invention.

FIG. 24 is a system diagram schematically showing a gas turbine plant according to an eleventh embodiment of the present invention. In this case, like reference numerals are used to designate the same components as the first and fourth embodiments or the corresponding part.

In this eleventh embodiment, the following matter is taken into consideration. More specifically, the high pressure air extracted from the intermediate stage of the air compressor 8 is supplied to the heat exchange section 16 of the fuel section 12 via the high pressure air supply system 29 so as to heat the fuel F, and then, the high pressure air whose temperature becomes low is supplied to the high temperature sections 31a and 31b of the gas turbine 10 as a cooling medium for cooling these high temperature sections via the pressure rising compressor 33, the check valve 64, the flow distributing devices 30a and 30b. In such a case, if the high pressure air of a proper quantity is not supplied to the high temperature sections 31a and 31b of the gas turbine 10 in accordance with various operating conditions, these high temperature sections 31a and 31b are burnt. Further, if the pressure ratio of the pressure rising compressor 33 is not kept at a proper value, surging is caused, and for this reason, the pressure rising compressor 33 becomes a danger state. Thus, in order to avoid the above disadvantage, a re-circulation system 65 is provided between the outlet side of the pressure rising compressor 33 and the inlet side of the check valve 64 so that a part of the high pressure air can be circulated.

In the re-circulation system 65, a bypass is made between the outlet side of the pressure rising compressor 33 and the inlet side of the check valve 64, and there is provided a re-circulation valve 66 so that the re-circulation system 65 is connected to the inlet side of the heat exchange section 16.

The re-circulation valve 66 includes a valve opening control section 67. The valve opening control section 67 calculates a pressure ratio of the pressure rising compressor 33 in response to a pressure signal from pressure instruments 68a and 68b provided on each of inlet and outlet sides of the pressure rising compressor 33, a temperature signal from a thermometer 69 provided on the high pressure air recovery system 32, a rotational speed signal from the rotational speed detector 61 provided on the gas turbine shaft 60, and a power signal from the power detector 62 provided on the driven equipment 11. Further, the valve opening control section 67 computes the valve opening signal so that the pressure ratio becomes a specified value determined by at least one of the rotational speed of the gas turbine shaft 60, the power signal of the driven equipment 11, and a high pressure air signal of the high pressure air recovery system 32, and then, supplies the operational signal to the re-circulation valve 66, and thus, performs a control for opening and closing the re-circulation valve.

As described above, according to this embodiment, in the transient state such as the rise-up of the rotational speed and the rise-up of load, a part of the high pressure air of the high pressure air supply system 29 is circulated via the re-circulation system 65, and thus, the pressure ratio of the pressure rising compressor 33 is kept at a proper value, so that the high temperature sections 31a and 31b of the gas turbine 10 can be securely cooled.

Figure 25:
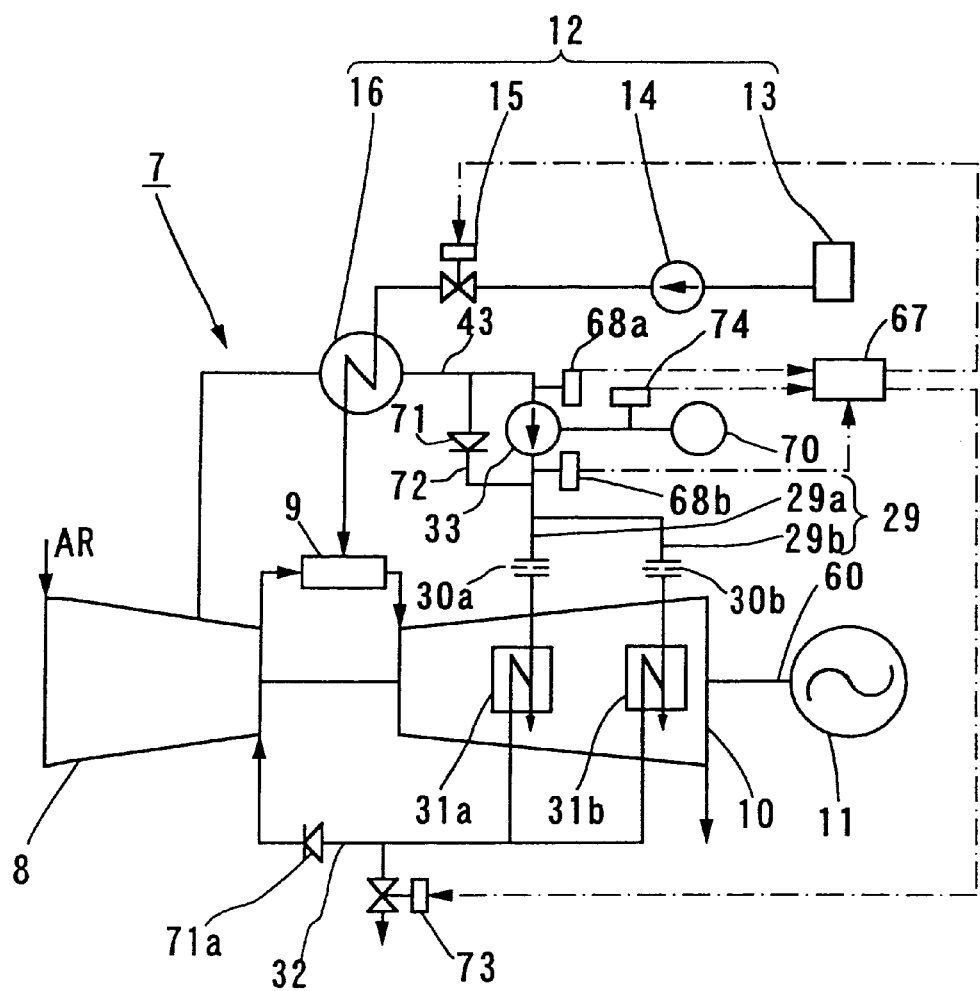
FIG. 25 is a system diagram schematically showing a first modified embodiment of the gas turbine plant according to the eleventh embodiment of the present invention.

FIG. 25 is a system diagram schematically showing a first modified embodiment of the gas turbine plant according to the eleventh embodiment of the present invention. In this case, like reference numerals are used to designate the same components as the eleventh embodiment or the corresponding part.

In this embodiment, the following matter is taken into consideration. More specifically, the high pressure air extracted from the intermediate stage of the air compressor 8 is supplied to the heat exchange section 16 of the fuel section 12 via the high pressure air supply system 29 so as to heat the fuel F, and then, the high pressure air whose temperature becomes low is supplied to the high temperature sections 31a and 31b of the gas turbine 10 as a cooling medium for cooling these high temperature sections via the pressure rising compressor 33, and the flow distributing devices 30a and 30b. In such a case, the pressure rising compressor 33 or a drive equipment 70 for pressure rising compressor is not operated due to any reasons. In order to avoid such disadvantage, the pressure rising compressor 33 is provided with a pressure rising compressor bypass system 72 including a check valve 71, and a discharge valve 73 is provided on an inlet side of a high pressure air recovery check valve 71a of the high pressure air recovery system 32. In this manner, the high temperature sections 31a and 31b of the gas turbine 10 are continuously cooled by a residual high pressure air of the air compressor 8 until the gas turbine plant 7 is stopped.

If an accident happens in the pressure rising compressor 33 or the drive equipment 70 for the pressure rising compressor and the operation becomes impossible, the valve opening control section 67 computes a valve opening signal on the basis of the pressure signal from the pressure instruments 68a and 68b and the rotational speed signal from a pressure rising compressor rotational speed (frequency) detector 74, and then, transmits the operational signal to the discharge valve 73 and the fuel valve 15 of the fuel section 12 so that the discharge valve 73 is opened while the fuel valve 15 being closed. When the discharge valve 73 is opened, the air compressor 8 supplies the residual high pressure air to the high temperature sections 31a and 31b of the gas turbine 10 via the high pressure air supply system 29, the check valve 71 and the pressure rising compressor bypass system 72 so as to cool these high temperature sections 31a and 31b. Thereafter, the residual high pressure air is discharged from the discharge valve 73 to the atmospheric air via the high pressure air recovery system 32. In this case, when the discharge valve 73 is fully opened, the pressure of the high pressure air passing through the high temperature sections 31a and 31b of the gas turbine 10 lowers. However, the high pressure air recovery check valve 71a is provided on the downstream side of the discharge valve 73, and therefore, the residual high pressure air from the air compressor 8 does not conversely flow into the discharge valve 73.

As described above, in this embodiment, until an accident happens in the pressure rising compressor 33 or in the pressure rising compressor drive equipment 70 and the gas turbine plant 7 is stopped, the high pressure air remaining in the air compressor 8 is supplied to the high temperature sections 31a and 31b of the gas turbine 10 via the high pressure sir supply system 29, the check valve 71 and the pressure rising compressor bypass system 72 so that these high temperature sections 31a and 31b are continuously cooled. Thus, it is possible to keep a material strength of these high temperature sections 31a and 31b of the gas turbine 10 at a preferable state, so that the lifetime of the material can be made long.

Figure 26:
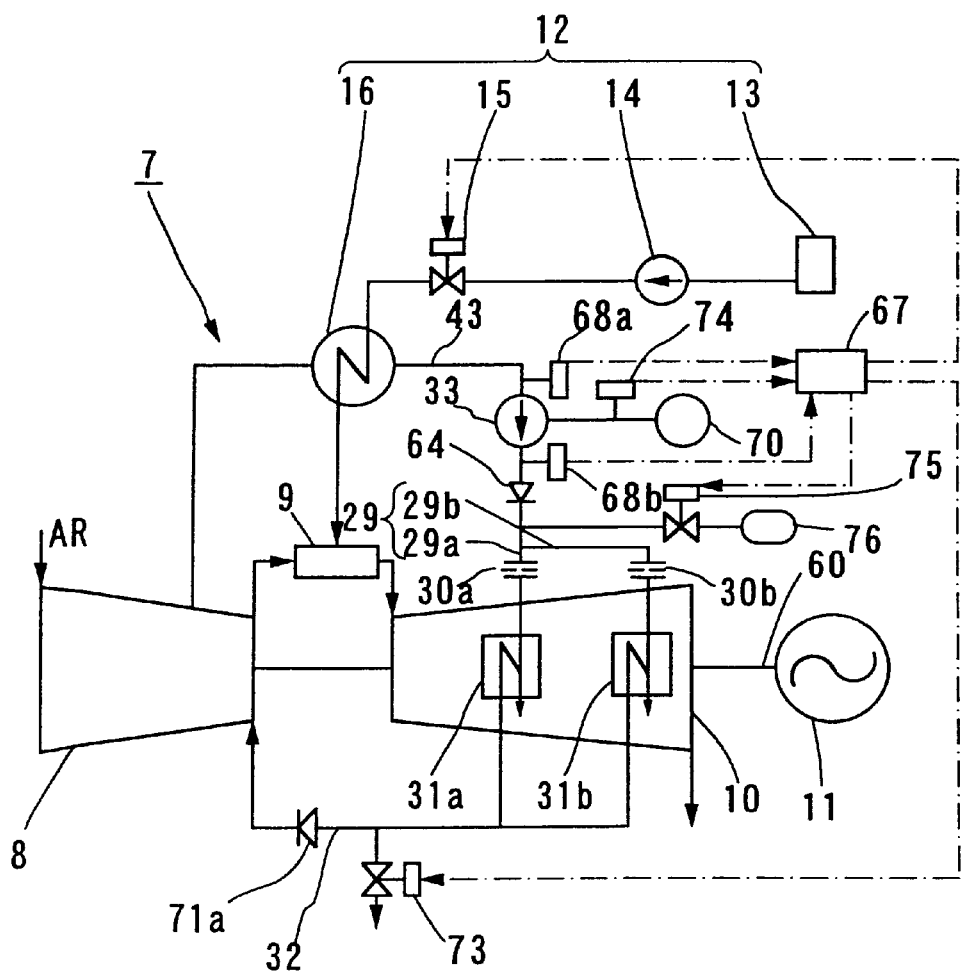
FIG. 26 is a system diagram schematically showing a second modified embodiment of the gas turbine plant according to the eleventh embodiment of the present invention.

FIG. 26 is a system diagram schematically showing a second modified embodiment of the gas turbine plant according to the eleventh embodiment of the present invention. In this case, like reference numerals are used to designate the same components as the eleventh embodiment or the corresponding part.

In this embodiment, the following matter is taken into consideration. More specifically, the high pressure air extracted from the intermediate stage of the air compressor 8 is supplied to the heat exchange section 16 of the fuel section 12 via the high pressure air supply system 29 so as to heat the fuel F, and then, the high pressure air whose temperature becomes low is supplied to the high temperature sections 31a and 31b of the gas turbine 10 as a cooling medium for cooling these high temperature sections via the pressure rising compressor 33, the check valve 64 and the flow distributing devices 30a and 30b. In such a case, the pressure rising compressor 33 or the drive equipment 70 for pressure rising compressor is not operated due to any reasons. In order to avoid such disadvantage, a flow control valve 75 and an accumulator 76 are provided on the outlet side of the check valve 64. The high temperature sections 31a and 31b of the gas turbine 10 are continuously cooled by an accumulated (stored) air of the accumulator 76 until the gas turbine plant 7 is stopped.

If an accident happens in the pressure rising compressor 33 or the drive equipment 70 for pressure rising compressor, and the operation is impossible, the valve opening control section 67 computes a valve opening signal on the basis of the pressure signal from the pressure instruments 68a and 68b and the rotational speed signal from a pressure rising compressor rotational speed detector 74, and then, transmits the operational signal to the discharge valve 73 provided on the inlet side of the high pressure air recovery check valve 71a of the high pressure air recovery system 32, the fuel valve 15 of the fuel section 12 and the flow control valve 75 so that the fuel valve 15 is closed while the discharge valve 73 and the flow control valve 75 being opened.

As described above, in this embodiment, until an accident happens in the pressure rising compressor 33 or in the pressure rising compressor drive equipment 70 and the gas turbine plant 7 is stopped, the accumulated air of the accumulator 76 is supplied to the high temperature sections 31a and 31b of the gas turbine 10 as a back-up. Thus, it becomes possible to keep the material strength for a long term without giving a damage to the material of these high temperature sections 31a and 31b.

Figure 27:
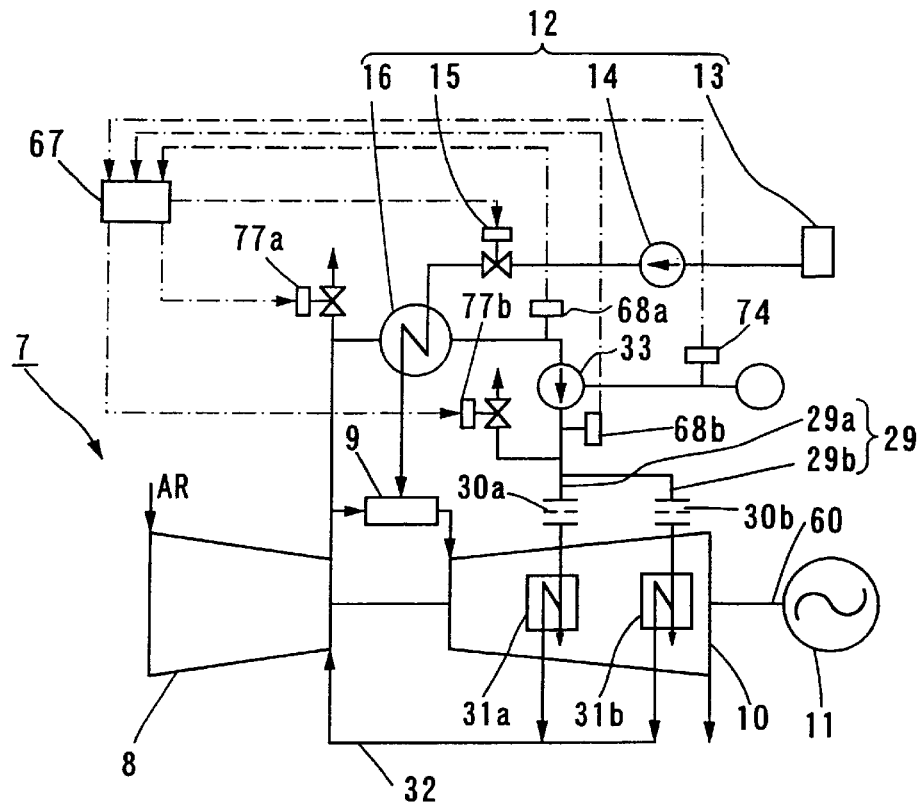
FIG. 27 is a system diagram schematically showing a third modified embodiment of the gas turbine plant according to the eleventh embodiment of the present invention.

FIG. 27 is a system diagram schematically showing a third modified embodiment of the gas turbine plant according to the eleventh embodiment of the present invention. In this case, like reference numerals are used to designate the same components as the eleventh embodiment or the corresponding part.

In this embodiment, like the first and second modified embodiment in the eleventh embodiment, the accident is taken into consideration. More specifically, discharge valves 77a and 77b are provided on the high pressure air supply system 29 on the inlet side of the heat exchange section 16 and the high pressure air supply system 29 on the outlet side of the pressure rising compressor 33, respectively. If an accident happens in the pressure rising compressor 33 or the drive equipment 70 for pressure rising compressor, according to the operational signal from the valve opening control section 67, the fuel valve 15 of the fuel section 12 is closed while the discharge valves 77a and 77b being opened, and then, the high pressure air of the high pressure air supply system 29 is discharged to the atmospheric air via these discharge valves 77a and 77b. Further, the high pressure air remaining in the air compressor 8 conversely flows into the high temperature sections 31a and 31b of the gas turbine 10 via the high pressure air recovery system 32 so that the high temperature sections 31a and 31b of the gas turbine 10 are cooled, and thereafter, is discharged to the atmospheric air via the discharge valve 77b.

As described above, in this embodiment, in the case where an accident happens in the pressure rising compressor 33 or in the pressure rising compressor drive equipment 70, the discharge valves 77a and 77b are opened so that the high pressure air of the high pressure air supply system is discharged to the atmospheric air, and during this discharge, the high pressure air remaining in the air compressor 8 conversely flows into the high temperature sections 31a and 31b of the gas turbine 10 via the high pressure air supply system so as to cool these high temperature sections 31a and 31b. Thus, no thermal stress or thermal fatigue is excessively applied to the material of the high temperature sections 31a and 31b of the gas turbine 10, so that the material strength can be kept at a preferable state.

Figure 28:
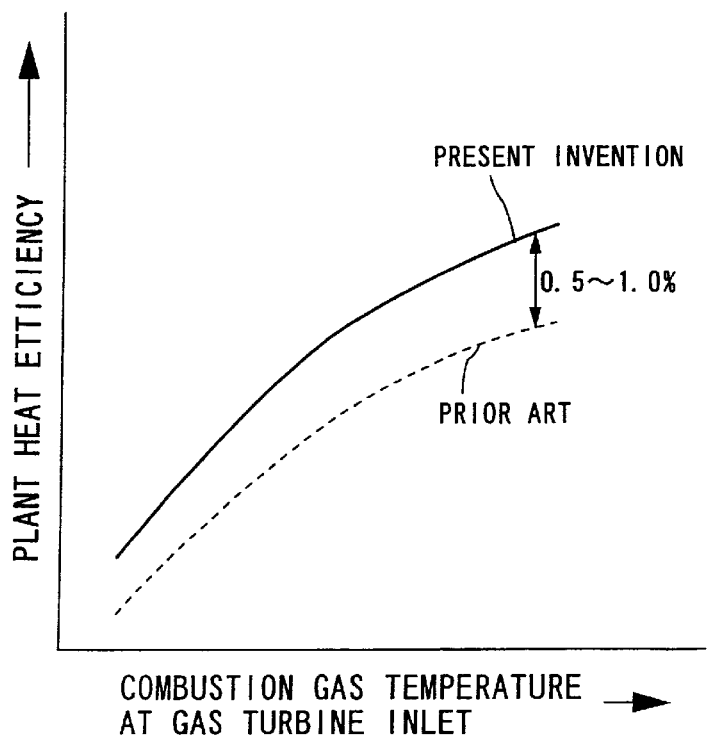
FIG. 28 is a graph showing a comparative result in a plant heat efficiency between the gas turbine plant according to each embodiment of the present invention and the prior art.
Figure 29:
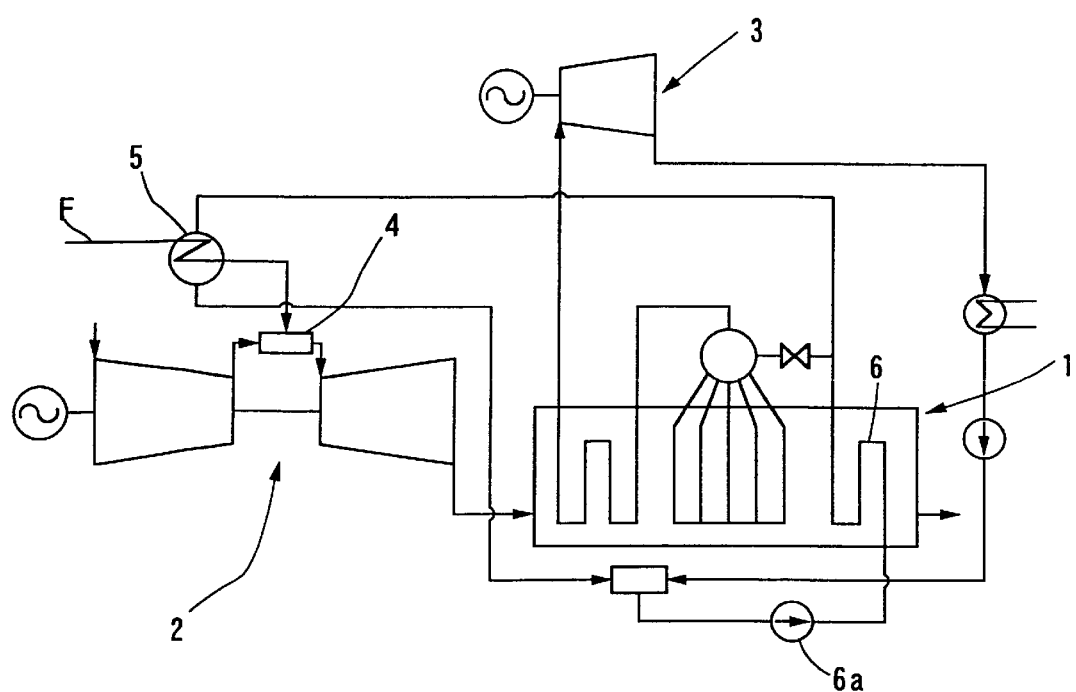
FIG. 29 is a system diagram schematically showing a conventional gas turbine plant which combines a steam turbine plant and an exhaust heat recovery boiler.

FIG. 28 is a graph showing a comparison in a plant heat (thermal) efficiency between a gas turbine plant according to each embodiment of the present invention and the prior art. In the gas turbine plant according to each embodiment of the present invention, the high pressure air of the air compressor 8 is used as a heating source, and the fuel F supplied from the fuel section 12 to the gas turbine combustor 9 is heated by the heat exchange section 16, and thus, the quantity of heat (energy) of the fuel F is enhanced. By doing so, it is possible to improve a plant heat efficiency by consumption of a small fuel F. In particular, in the case where the same temperature gas turbine drive gas is generated by a gas turbine plant according to each embodiment of the present invention and the prior art, the gas turbine plant according to each embodiment of the present invention and the prior art makes it possible to relatively reduce the consumption of the fuel F as compared with the prior art. Therefore, the plant heat efficiency can be improved about 0.5 to 1.0% as compared with the prior art.

It is to be noted that the present invention is not limited to the described embodiments and many other changes, modifications and combinations thereof will be made without departing from the scopes of the appended claims.

What is claimed is:

1. A gas turbine comprising:

an air compressor;

a gas turbine including at least one high temperature section;

driven equipment, said air compressor, said gas turbine and said driven equipment being operatively connected in series;

a gas turbine combustor arranged between the air compressor and the gas turbine;

a fuel system for supplying a fuel to the gas turbine combustor, said fuel system being provided with a fuel valve;

a high pressure air supply system operatively connected to the high temperature section of the gas turbine for supplying high pressure air from the air compressor thereto;

a heat exchange section provided for the high pressure air supply system for heating the fuel supplied to the gas turbine combustor from the fuel system;

a pressure rising compressor for rising pressure of the high pressure air after heating the fuel and for supplying the high pressure air to at least one of the high temperature sections of the gas turbine as a cooling medium; and at least one high pressure air recovery system provided with a high pressure air recovery check valve for recovering an overall quantity or part of the high pressure air after cooling the at least one of the high temperature sections of the gas turbine to the air compressor, said pressure rising compressor being provided with a bypass system including a check valve and a valve opening control means which closes the fuel valve of the fuel system when an accident happens in the pressure rising compressor while opening a discharge valve provided on an inlet side of the high pressure air recovery check valve of the high pressure air recovery system.

2. A gas turbine plant according to claim 1, wherein said valve opening control means serves to close the fuel valve of the fuel system in response to the pressure signal from each of an inlet side and an outlet side of the pressure rising compressor and a rotational speed signal of pressure rising compressor driving equipment while opening a discharge valve provided on the inlet side of the high pressure air recovery check valve of the high pressure air recovery system.

* * * * *